US012021898B2

(12) United States Patent
Ambardekar et al.

(10) Patent No.: US 12,021,898 B2
(45) Date of Patent: Jun. 25, 2024

(54) PROCESSES AND SYSTEMS THAT TRANSLATE POLICIES IN A DISTRIBUTED COMPUTING SYSTEM USING A DISTRIBUTED INDEXING ENGINE

(71) Applicant: NICIRA, INC., Palo Alto, CA (US)

(72) Inventors: Prashant Ambardekar, Pune (IN); Rajiv Krishnamurthy, Palo Alto, CA (US); Prayas Gaurav, Pune (IN); Ujwala Kawalay, Pune (IN); Gurprit Johal, Pune (IN)

(73) Assignee: NICIRA, INC., Palo Alto, CA (US)

( * ) Notice: Subject to any disclaimer, the term of this patent is extended or adjusted under 35 U.S.C. 154(b) by 757 days.

(21) Appl. No.: 16/713,025

(22) Filed: Dec. 13, 2019

(65) Prior Publication Data

US 2020/0244702 A1 Jul. 30, 2020

(30) Foreign Application Priority Data

Jan. 25, 2019 (IN) .............................. 201941003117

(51) Int. Cl.
*H04L 9/40* (2022.01)
*G06F 9/455* (2018.01)
*G06F 16/28* (2019.01)

(52) U.S. Cl.
CPC .......... *H04L 63/20* (2013.01); *G06F 9/45558* (2013.01); *G06F 16/289* (2019.01); *H04L 63/10* (2013.01); *G06F 2009/45587* (2013.01); *G06F 2009/45591* (2013.01); *G06F 2009/45595* (2013.01)

(58) Field of Classification Search
CPC ....... H04L 63/20; H04L 63/10; G06F 16/289; G06F 9/45558
See application file for complete search history.

(56) References Cited

U.S. PATENT DOCUMENTS

2004/0064693 A1* 4/2004 Pabla .................... H04L 67/104
713/168
2018/0144004 A1* 5/2018 Bedi ..................... G06F 16/221

OTHER PUBLICATIONS

Kazemian (Header Space Analysis, thesis, 152 pages, Jun. 2013 ) (Year: 2013).*

* cited by examiner

*Primary Examiner* — Oleg Korsak
(74) *Attorney, Agent, or Firm* — Quarles & Brady LLP

(57) ABSTRACT

This disclosure presents processes and systems that translate policies defined for virtual objects, such as virtual servers, applications, and databases, of a distributed computing system into identity information of services provided by virtual objects to computing devices located outside the distributed computing system. Processes and systems form object graphs of computing device identity information, virtual objects, and virtual object identify information. Processes and systems translate polices for controlling network between the computing devices and the virtual objects into identity information of the computing devices and the virtual objects. The identify information of the virtual objects and the computing devices is used to create rules for controlling network traffic between the virtual objects and the computing devices. The rules are distributed to hosts of the distributed computing system that execute the rules, allowing access by the computing devices to services provided by the virtual objects.

13 Claims, 23 Drawing Sheets

| 1802 | |
|---|---|
| High-level object | IP address |
| VM₁ | 192.168.1.101 |
| VM₂ | 192.168.1.102 |
| VM₃ | 192.168.1.103 |
| VM₄ | 192.168.1.104 |
| VM₅ | 192.168.1.105 |
| VM₆ | 192.168.1.106 |
| VM₇ | 192.168.1.107 |
| VM₈ | 192.168.1.108 |
| VM₉ | 192.168.1.109 |
| VM₁₀ | 192.168.1.110 |
| VM₁₁ | 192.168.1.111 |
| VM₁₂ | 192.168.1.112 |

| 1804 | |
|---|---|
| Users | Device address |
| User 1 | 2110 |
| User 2 | 1624 |
| User 3 | 1086 |
| ... | ... |
| User N | 1342 |

| 1806 | |
|---|---|
| Users | IP address |
| User 1 | |
| User 2 | 10.107.51.11 |
| User 3 | 10.107.53.09 |
| ... | ... |
| User N | 10.108.73.11 |

FIG. 18

PROCESSES AND SYSTEMS THAT TRANSLATE POLICIES IN A DISTRIBUTED COMPUTING SYSTEM USING A DISTRIBUTED INDEXING ENGINE

RELATED APPLICATIONS

Benefit is claimed under 35 U.S.C. 119(a)-(d) to Foreign Application Serial No. 201941003117 filed in India entitled "PROCESSES AND SYSTEMS THAT TRANSLATE POLICIES IN A DISTRIBUTED COMPUTING SYSTEM USING A DISTRIBUTED INDEXING ENGINE", on Jan. 25, 2019, by VMWARE, INC., which is herein incorporated in its entirety by reference for all purposes.

TECHNICAL FIELD

This disclosure is directed to processes and systems that translate policies defined for virtual objects to identity information regarding service provided by the virtual objects using a distributed indexing engine.

BACKGROUND

Electronic computing has evolved from primitive, vacuum-tube-based computer systems, initially developed during the 1940s, to modern electronic computing systems in which large numbers of multi-processor computer systems, such as server computers, work stations, and other individual computing systems are networked together with large-capacity data-storage devices and other electronic devices to produce geographically distributed computing systems with hundreds of thousands, millions, or more components that provide enormous computational bandwidths and data-storage capacities. These large, distributed computing systems include data centers and cloud-computing facilities and are made possible by advances in computer networking, distributed operating systems and applications, data-storage appliances, computer hardware, and software technologies.

The number and size of distributed computing systems have grown to meet the increasing demand for information technology ("IT") services, such as running applications for organizations that provide business services, web services, and other cloud services to millions of customers. Virtualization has contributed to moving an increasing number of cloud services to distributed computing systems by creating software-based, or virtual, representations of server computers, data-storage devices, and networks. For example, a virtual computer system, also knowns as a virtual machine ("VM"), is a self-contained application and operating system implemented in software. Unlike applications that run on a computer system, a VM may be created or destroyed on demand, may be migrated from one server computer to another in a distributed computer system, and may be cloned to create multiple VMs that run on one or more server computers. Network virtualization has enabled the creation, provisioning, and management of virtual networks implemented in software as logical networking devices and services, such as logical ports, switches, routers, firewalls, load balancers, virtual private networks ("VPNs") and more to connect workloads. Network virtualization allows applications and VMs to run on a virtual network as if the applications and VMs were running on a physical network and has enabled the creation of software-defined data centers within a physical data center. As a result, virtualization has proven to be an efficient way of reducing IT expenses while increasing computational efficiency, access to cloud services, and agility for all size businesses, organizations, and customers.

With the increase of virtualization has come the development of virtual network management tools that execute policies for managing network traffic and security of distributed computing systems. Network administrators create policies that specify which applications and services are given priority, allowed, or denied. Network management tools execute administrator-created policies to control various kinds of virtual network traffic, such as data, voice, and video, and whether objects, such as VMs and applications running in a distributed computed system, are allowed to receive data from other objects and devices located inside and outside the distributed computing system. Network management tools typically translate policies to low-level identities, such as internet protocol ("IP") addresses and logical ports, using translation logic created by various different translation logic providers. Each translation logic is associated with one of the various types of objects running in the distributed computing system. For example, typical translation implementations in network management tools are executed using various different translation components. Each translation component carries out a specific translation process and is responsible for only translating associated object types. Translation results from one step are passed to subsequent translation steps, which involves multiple calls to different databases, leading to inefficient, time consuming, and unnecessary database queries. The results from various different translation components are combined to enforce the policy.

SUMMARY

Computational processes and systems described herein are directed to a generic translation of policies defined for virtual objects, such as virtual machines, to identity information, such as IP addresses and logical port addresses, of services provided by virtual objects to computing devices located outside the distributed computing system. A network management server forms an object graph of computing device identity information, virtual objects, and virtual object identify information. The network management server translates polices for controlling network between the computing devices and the virtual objects into identity information of the computing devices and the virtual objects by using a distribute indexing engine to traverse the object graph. The identify information of the virtual objects and the computing devices is used to create rules for controlling network traffic between the virtual objects and the computing devices. The network management server distributes the rules to hosts of the distributed computing system that execute the rules, allowing access by the computing devices to services provided by the virtual objects.

DESCRIPTION OF THE DRAWINGS

FIG. 18 shows an example of virtual objects and user indexes stored in a distributed indexing engine database.

DETAILED DESCRIPTION

This disclosure presents computational processes and systems that translate policies defined for a set of virtual objects, such as virtual servers, applications, and databases, to identity information of services and processes of a distributed computing system using a distributed indexing engine. In a first subsection, computer hardware, complex computational systems, and virtualization are described. Processes and systems to translate virtual objects to low-level identity information of services and processes provided in a distributed computing system are described below in a second subsection.

Computer Hardware, Complex Computational Systems, and Virtualization

The term "abstraction" does not mean or suggest an abstract idea or concept. Computational abstractions are tangible, physical interfaces that are implemented using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. Software is a sequence of encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices. Multi-cloud aggregations, cloud-computing services, virtual-machine containers and virtual machines, containers, communications interfaces, and many of the other topics discussed below are tangible, physical components of physical, electro-optical-mechanical computer systems.

Figure 1:
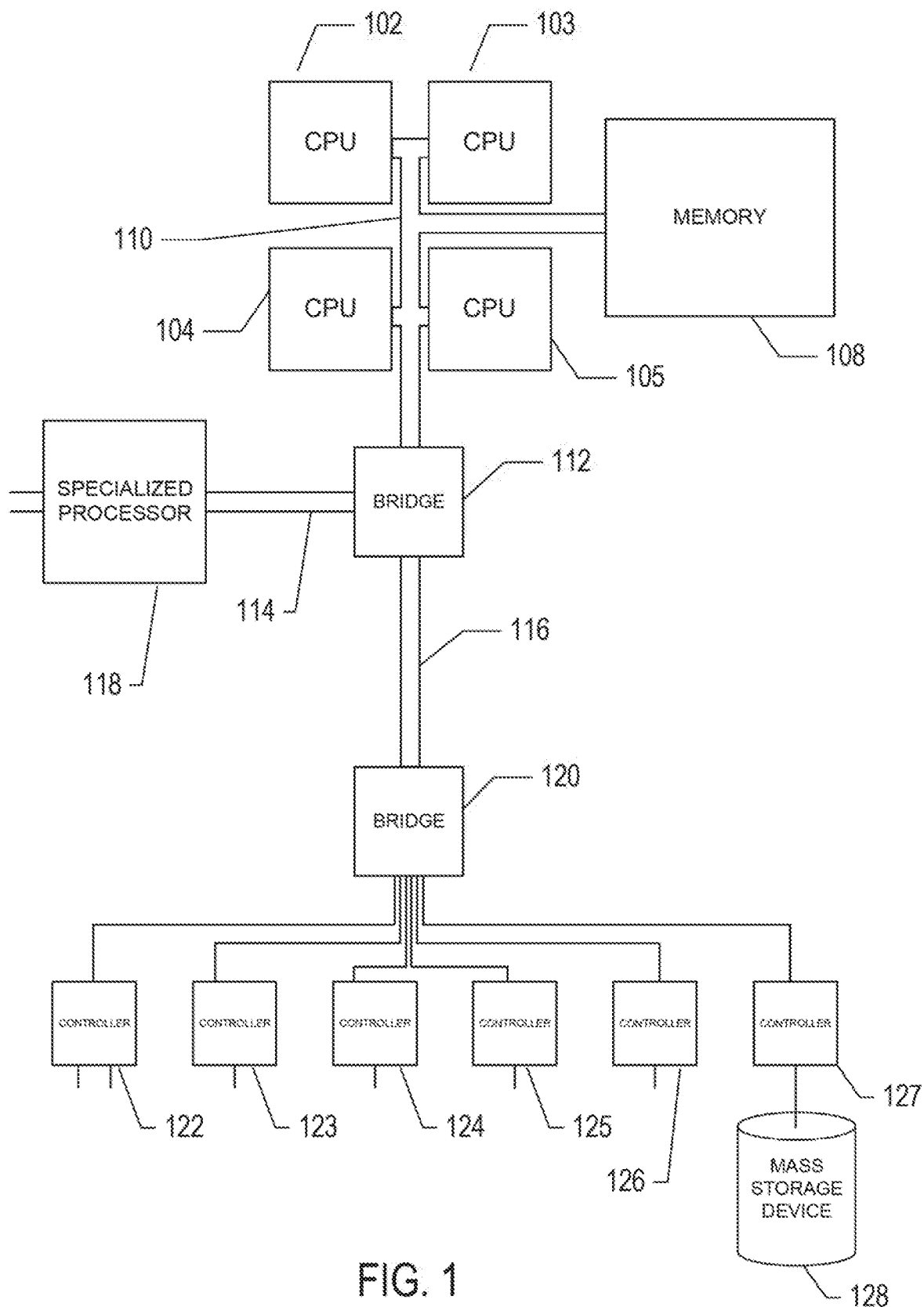
FIG. 1 shows an architectural diagram for various types of computers.

FIG. 1 shows a general architectural diagram for various types of computers. Computers that receive, process, and store event messages may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational devices. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of server computers and workstations, and higher-end mainframe computers, but may also include a plethora of various types of special-purpose computing devices, including data-storage systems, communications routers, network nodes, tablet computers, and mobile telephones.

Figure 2:
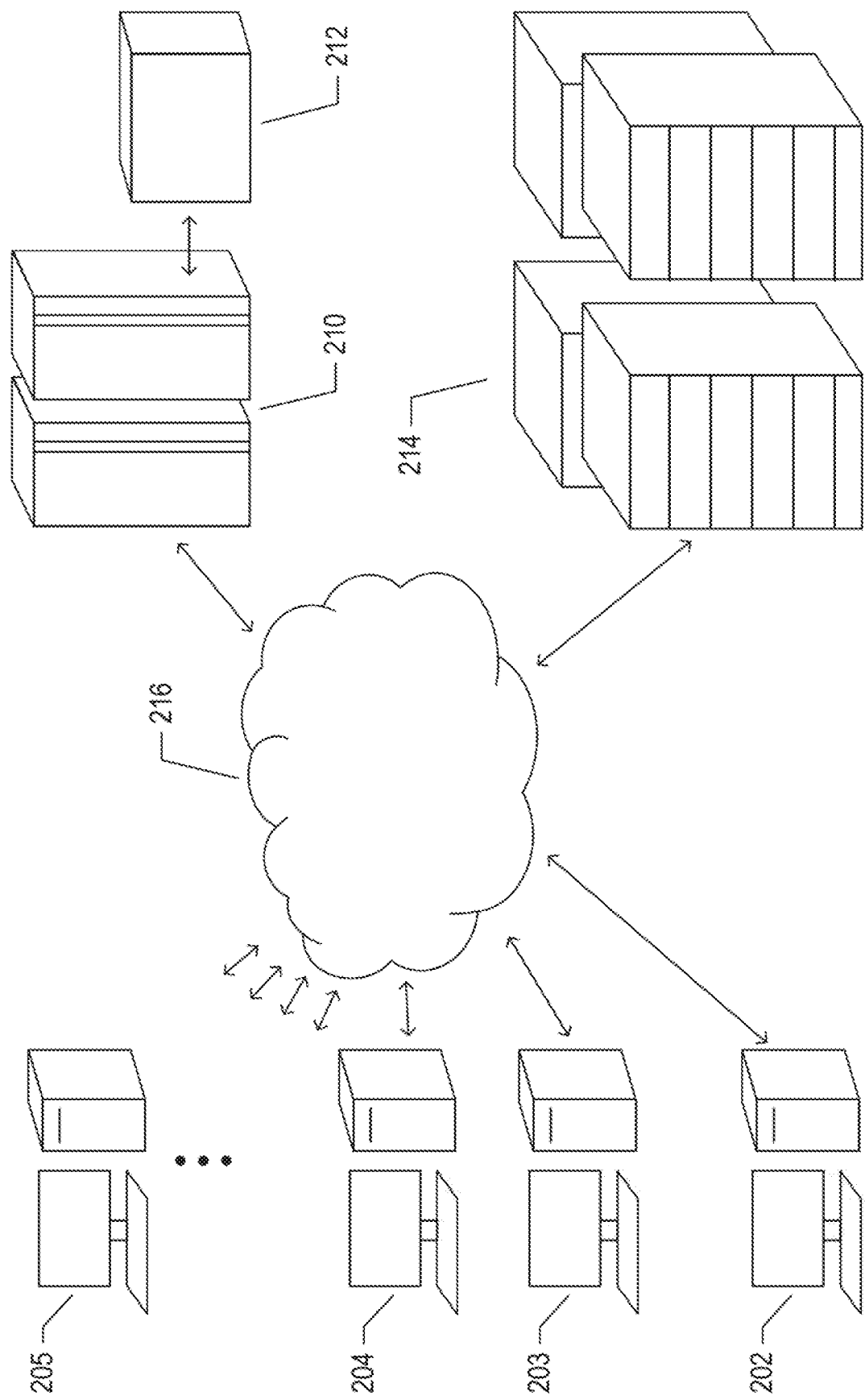
FIG. 2 shows an Internet-connected distributed computer system.

FIG. 2 shows an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted server computers or blade servers all interconnected through various communications and networking systems that together comprise the Internet 216. Such distributed computing systems provide diverse arrays of functionalities. For example, a PC user may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web server computers, back-end computer systems, and data-storage systems for serving web pages to remote customers, receiving orders through the web-page interface, processing the orders, tracking completed orders, and other myriad different tasks associated with an e-commerce enterprise.

Figure 3:
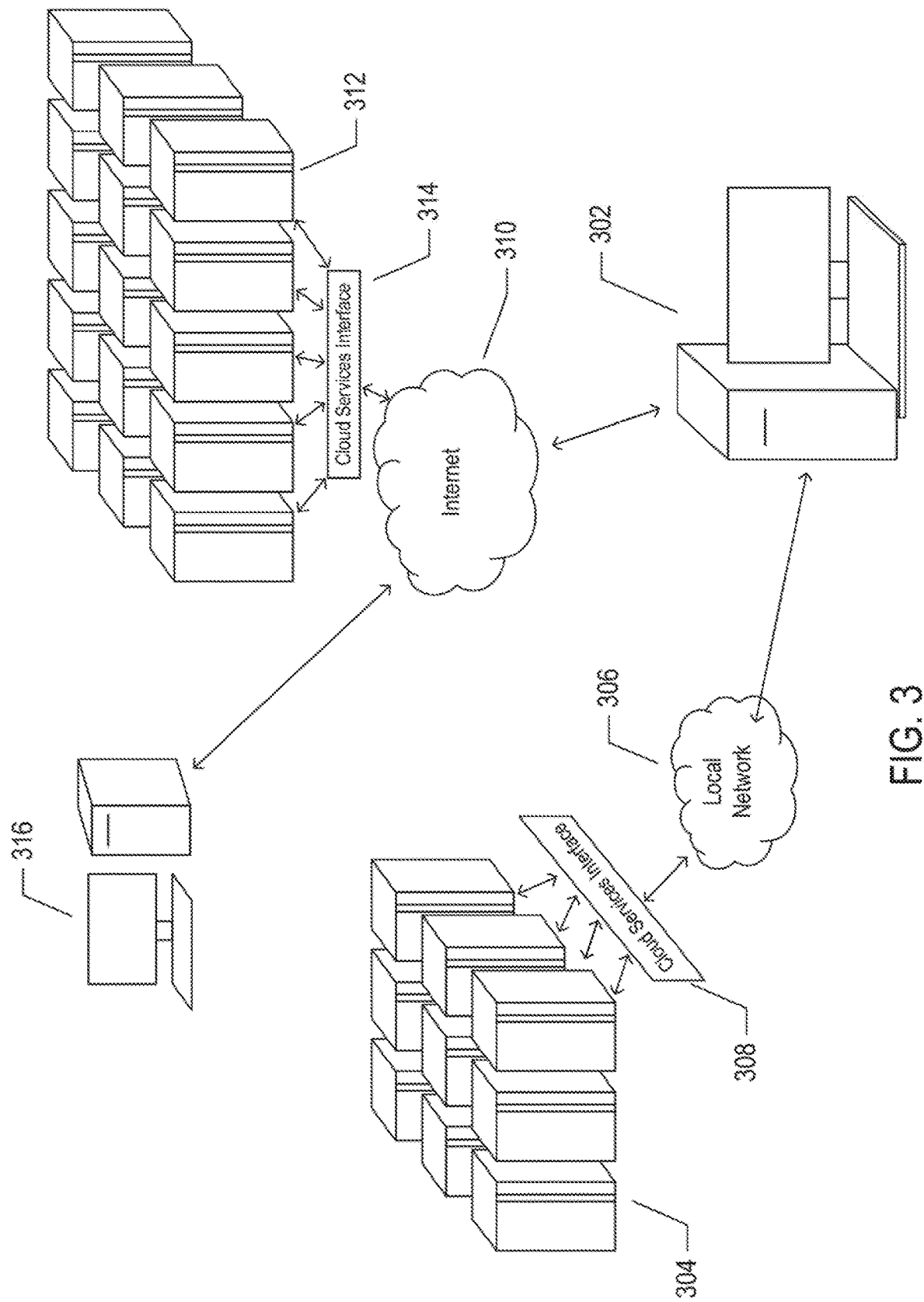
FIG. 3 shows cloud computing.

FIG. 3 shows cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the devices to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and data-base-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
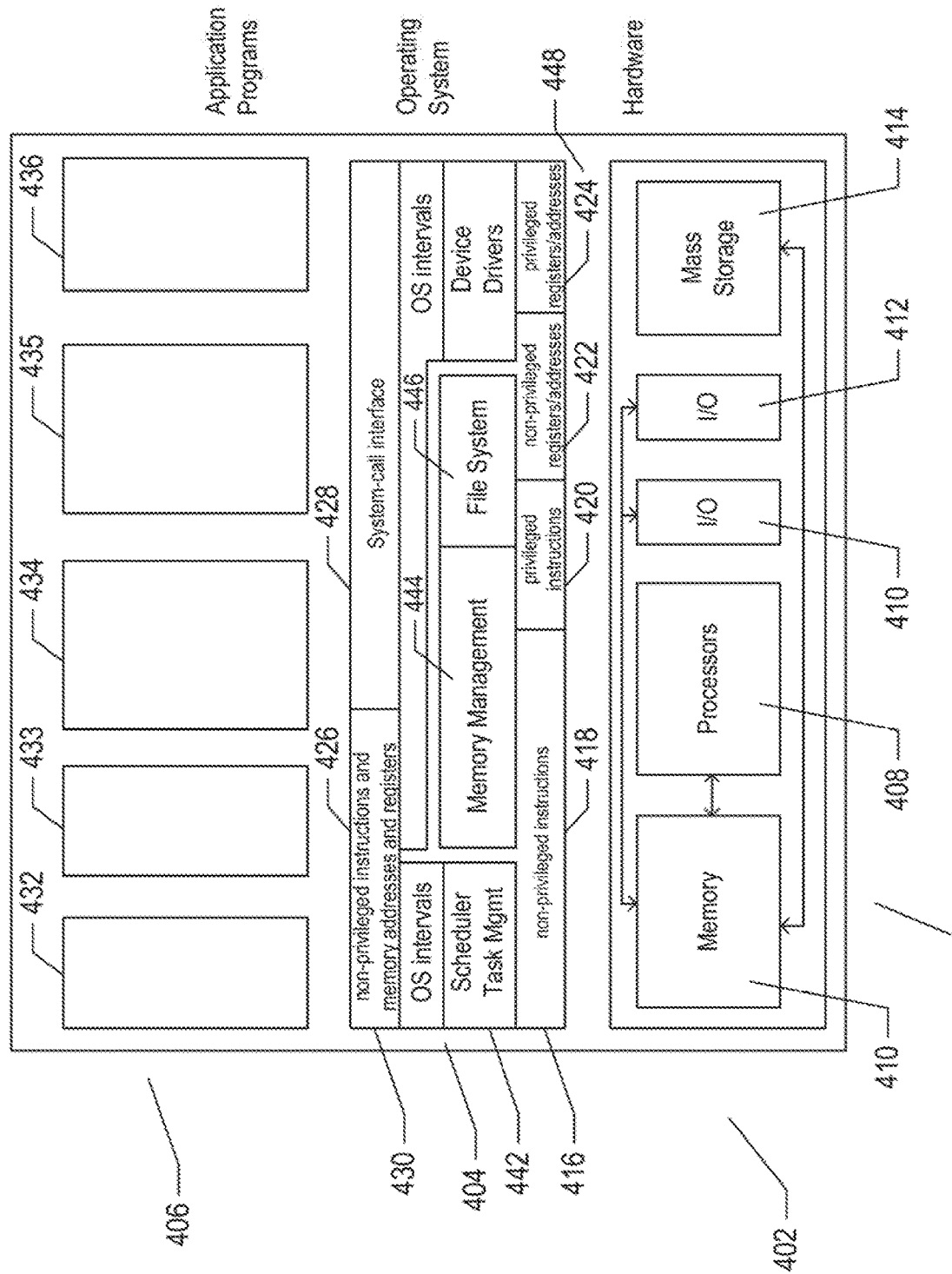
FIG. 4 shows generalized hardware and software components of a general-purpose computer system.

FIG. 4 shows generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of different application programs and higher-level computational entities, providing to each application program a virtual, stand-alone system devoted entirely to the application program. From the application program's standpoint, the application program executes continuously without concern for the need to share processor devices and other system devices with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 446 facilitates abstraction of mass-storage-device and memory devices as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within different types of computer hardware. In many cases, popular application programs and computational systems are developed to run on only a subset of the available operating systems and can therefore be executed within only a subset of the different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
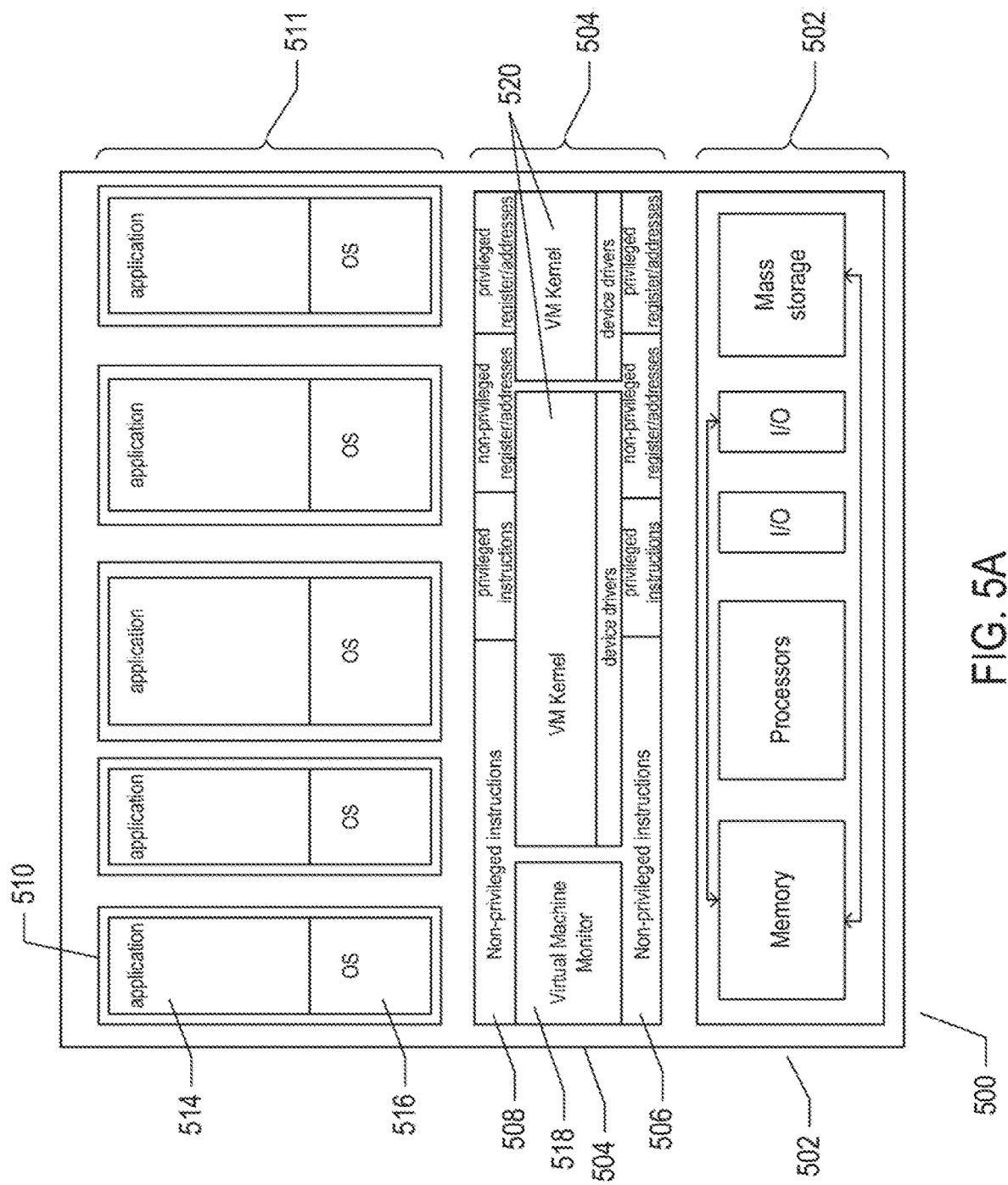
FIGS. 5A-5B show two types of virtual machine ("VM") and VM execution environments.
Figure 5B:
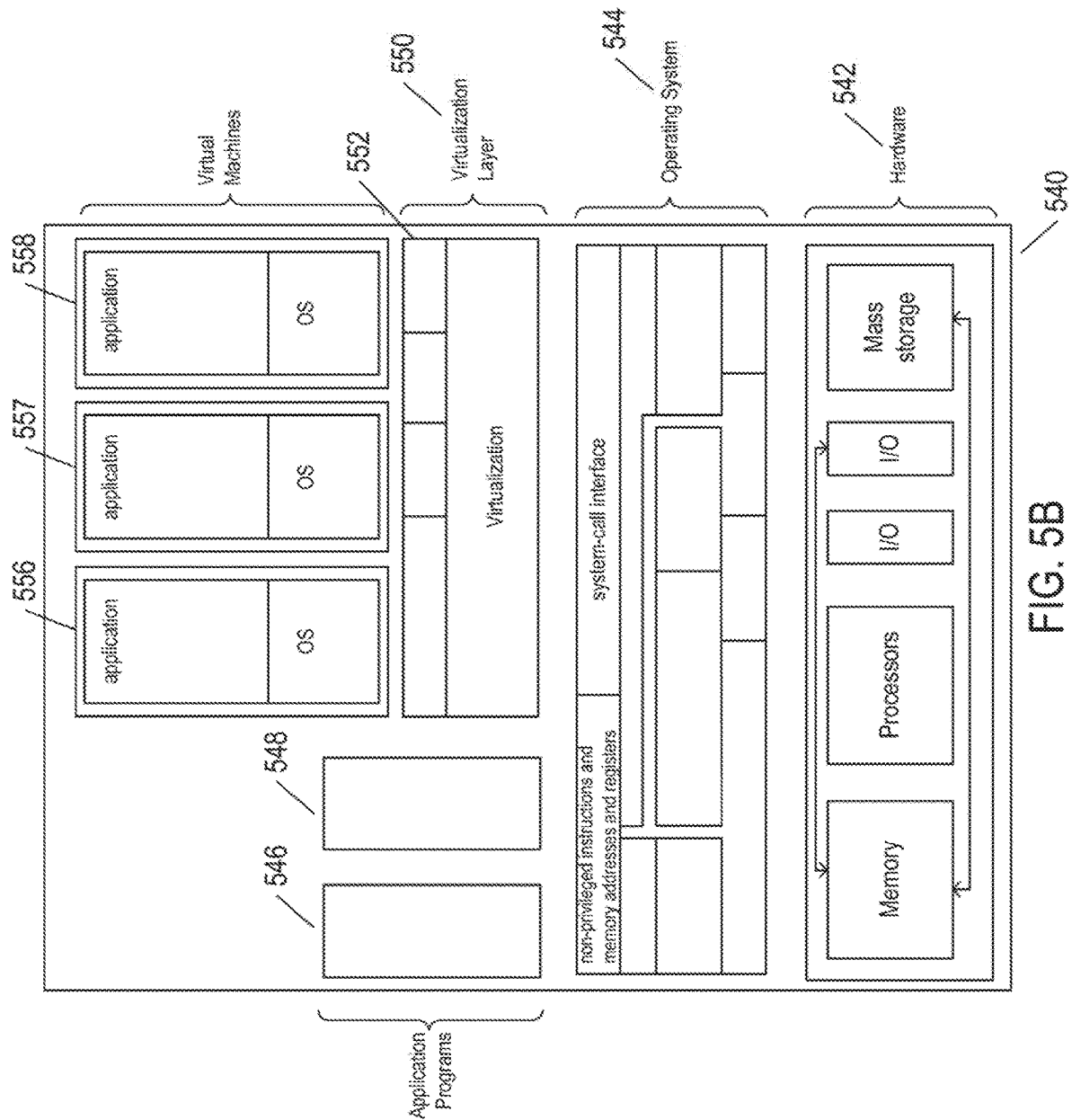

For the above reasons, a higher level of abstraction, referred to as the "virtual machine," ("VM") has been developed and evolved to further abstract computer hardware in order to address many difficulties and challenges associated with traditional computing systems, including the compatibility issues discussed above. FIGS. 5A-B show two types of VM and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment shown in FIG. 5A features a virtual layer 504 that interfaces through a virtualization-layer/hardware-layer interface 506, equivalent to interface 416 in FIG. 4, to the hardware. The virtual layer 504 provides a hardware-like interface to many VMs, such as VM 510, in a virtual-machine layer 511 executing above the virtual layer 504. Each VM includes one or more application programs or other higher-level computational entities packaged together with an operating system, referred to as a "guest operating system," such as application 514 and guest operating system 516 packaged together within VM 510. Each VM is thus equivalent to the operating-system layer 404 and application-program layer 406 in the general-purpose computer system shown in FIG. 4. Each guest operating system within a VM interfaces to the virtual layer interface 504 rather than to the actual hardware interface 506. The virtual layer 504 partitions hardware devices into abstract virtual-hardware layers to which each guest operating system within a VM interfaces. The guest operating systems within the VMs, in general, are unaware of the virtual layer and operate as if they were directly accessing a true hardware interface. The virtual layer 504 ensures that each of the VMs currently executing within the virtual environment receive a fair allocation of underlying hardware devices and that all VMs receive sufficient devices to progress in execution. The virtual layer 504 may differ for different guest operating systems. For example, the virtual layer is generally able to provide virtual hardware interfaces for a variety of different types of computer hardware. This allows, as one example, a VM that includes a guest operating system designed for a particular computer architecture to run on hardware of a different architecture. The number of VMs need not be equal to the number of physical processors or even a multiple of the number of processors.

The virtual layer 504 includes a virtual-machine-monitor module 518 ("VMM"), also called a "hypervisor," that virtualizes physical processors in the hardware layer to create virtual processors on which each of the VMs executes. For execution efficiency, the virtual layer attempts to allow VMs to directly execute non-privileged instructions and to directly access non-privileged registers and memory. However, when the guest operating system within a VM accesses virtual privileged instructions, virtual privileged registers, and virtual privileged memory through the virtual layer 504, the accesses result in execution of virtualization-layer code to simulate or emulate the privileged devices. The virtual layer additionally includes a kernel module 520 that manages memory, communications, and data-storage machine devices on behalf of executing VMs ("VM kernel"). The VM kernel, for example, maintains shadow page tables on each VM so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtual layer 504 essentially schedules execution of VMs much like an operating system schedules execution of application programs, so that the VMs each execute within a complete and fully functional virtual hardware layer.

FIG. 5B shows a second type of virtualization. In FIG. 5B, the computer system 540 includes the same hardware layer 542 and operating system layer 544 as the hardware layer 402 and the operating system layer 404 shown in FIG. 4. Several application programs 546 and 548 are shown running in the execution environment provided by the operating system 544. In addition, a virtual layer 550 is also provided, in computer 540, but, unlike the virtual layer 504 discussed with reference to FIG. 5A, virtual layer 550 is layered above the operating system 544, referred to as the "host OS," and uses the operating system interface to access operating-system-provided functionality as well as the hardware. The virtual layer 550 comprises primarily a VMM and a hardware-like interface 552, similar to hardware-like interface 508 in FIG. 5A. The hardware-layer interface 552, equivalent to interface 416 in FIG. 4, provides an execution environment for a number of VMs 556-558, each including one or more application programs or other higher-level computational entities packaged together with a guest operating system.

In FIGS. 5A-5B, the layers are somewhat simplified for clarity of illustration. For example, portions of the virtual layer 550 may reside within the host-operating-system kernel, such as a specialized driver incorporated into the host operating system to facilitate hardware access by the virtual layer.

It should be noted that virtual hardware layers, virtual layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtual layers, and guest operating systems are abstract or intangible. Virtual hardware layers, virtual layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
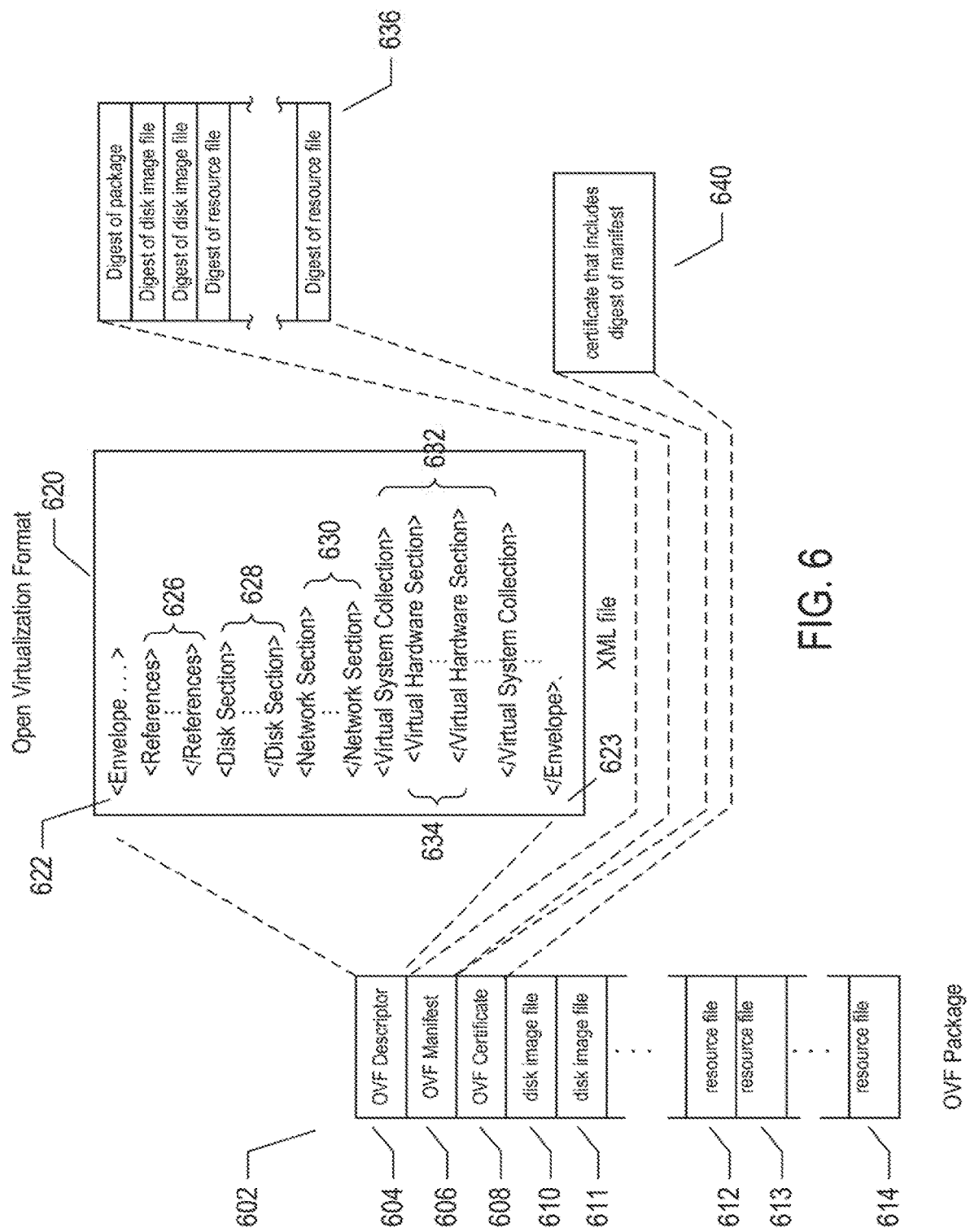
FIG. 6 shows an example of an open virtualization format package.

A VM or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a VM within one or more data files. FIG. 6 shows an OVF package. An OVF package 602 includes an OVF descriptor 604, an OVF manifest 606, an OVF certificate 608, one or more disk-image files 610-611, and one or more device files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a network section 630 that includes meta information about all of the logical networks included in the OVF package, and a collection of virtual-machine configurations 632 which further includes hardware descriptions of each VM 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and device files 612 are digitally encoded content, such as operating-system images. A VM or a collection of VMs encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more VMs that is encoded within an OVF package.

The advent of VMs and virtual environments has alleviated many of the difficulties and challenges associated with traditional general-purpose computing. Machine and operating-system dependencies can be significantly reduced or eliminated by packaging applications and operating systems together as VMs and virtual appliances that execute within virtual environments provided by virtual layers running on many different types of computer hardware. A next level of abstraction, referred to as virtual data centers or virtual infrastructure, provide a data-center interface to virtual data centers computationally constructed within physical data centers.

Figure 7:
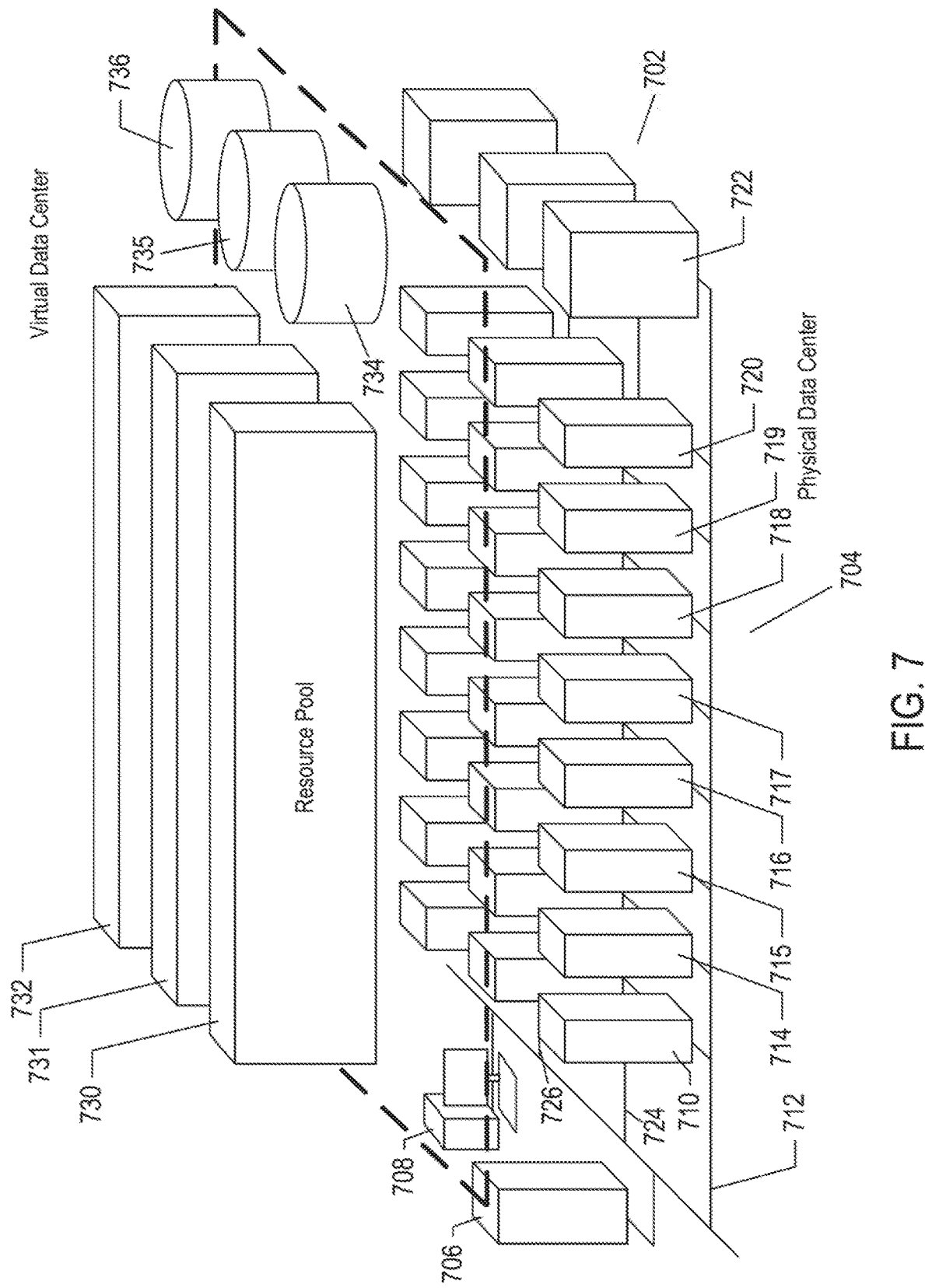
FIG. 7 shows virtual data centers provided as an abstraction of underlying physical-data-center hardware components.

FIG. 7 shows virtual data centers provided as an abstraction of underlying physical-data-center hardware components. In FIG. 7, a physical data center 702 is shown below a virtual-interface plane 704. The physical data center consists of a virtual-data-center management server computer 706 and any of various different computers, such as PC 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight server computers and a mass-storage array. The individual server computers, such as server computer 710, each includes a virtual layer and runs multiple VMs. Different physical data centers may include many different types of computers, networks, data-storage systems and devices connected according to many different types of connection topologies. The virtual-interface plane 704, a logical abstraction layer shown by a plane in FIG. 7, abstracts the physical data center to a virtual data center comprising one or more device pools, such as device pools 730-732, one or more virtual data stores, such as virtual data stores 734-736, and one or more virtual networks. In certain implementations, the device pools abstract banks of server computers directly interconnected by a local area network.

The virtual-data-center management interface allows provisioning and launching of VMs with respect to device pools, virtual data stores, and virtual networks, so that virtual-data-center administrators need not be concerned with the identities of physical-data-center components used to execute particular VMs. Furthermore, the virtual-data-center management server computer 706 includes functionality to migrate running VMs from one server computer to another in order to optimally or near optimally manage device allocation, provides fault tolerance, and high availability by migrating VMs to most effectively utilize underlying physical hardware devices, to replace VMs disabled by physical hardware problems and failures, and to ensure that multiple VMs supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of VMs and virtual appliances as well as to provide high-level, distributed functionalities that involve pooling the devices of individual server computers and migrating VMs among server computers to achieve load balancing, fault tolerance, and high availability.

Figure 8:
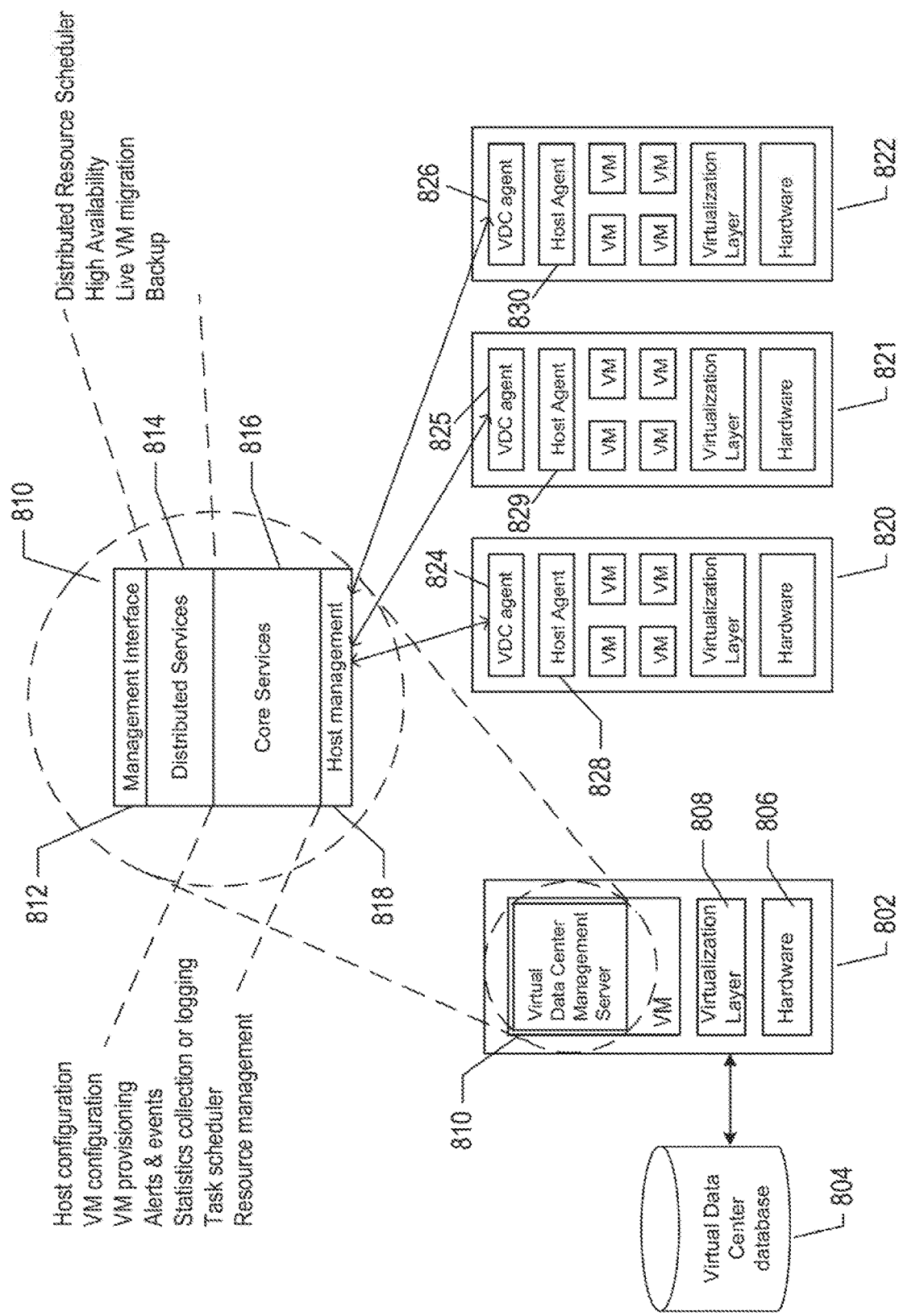
FIG. 8 shows virtual-machine components of a virtual-data-center management server and physical servers of a physical data center.

FIG. 8 shows virtual-machine components of a virtual-data-center management server computer and physical server computers of a physical data center above which a virtual-data-center interface is provided by the virtual-data-center management server computer. The virtual-data-center management server computer 802 and a virtual-data-center database 804 comprise the physical components of the management component of the virtual data center. The virtual-data-center management server computer 802 includes a hardware layer 806 and virtual layer 808, and runs a virtual-data-center management-server VM 810 above the virtual layer. Although shown as a single server computer in FIG. 8, the virtual-data-center management server computer ("VDC management server") may include two or more physical server computers that support multiple VDC-management-server virtual appliances. The virtual-data-center management-server VM 810 includes a management-interface component 812, distributed services 814, core services 816, and a host-management interface 818. The host-management interface 818 is accessed from any of various computers, such as the PC 708 shown in FIG. 7. The host-management interface 818 allows the virtual-data-center administrator to configure a virtual data center, provision VMs, collect statistics and view log files for the virtual data center, and to carry out other, similar management tasks. The host-management interface 818 interfaces to virtual-data-center agents 824, 825, and 826 that execute as VMs within each of the server computers of the physical data center that is abstracted to a virtual data center by the VDC management server computer.

The distributed services 814 include a distributed-device scheduler that assigns VMs to execute within particular physical server computers and that migrates VMs in order to most effectively make use of computational bandwidths, data-storage capacities, and network capacities of the physical data center. The distributed services 814 further include a high-availability service that replicates and migrates VMs in order to ensure that VMs continue to execute despite problems and failures experienced by physical hardware components. The distributed services 814 also include a live-virtual-machine migration service that temporarily halts execution of a VM, encapsulates the VM in an OVF package, transmits the OVF package to a different physical server computer, and restarts the VM on the different physical server computer from a virtual-machine state recorded when execution of the VM was halted. The distributed services 814 also include a distributed backup service that provides centralized virtual-machine backup and restore.

The core services 816 provided by the VDC management server VM 810 include host configuration, virtual-machine configuration, virtual-machine provisioning, generation of virtual-data-center alerts and events, ongoing event logging and statistics collection, a task scheduler, and a device-management module. Each physical server computers 820-822 also includes a host-agent VM 828-830 through which the virtual layer can be accessed via a virtual-infrastructure application programming interface ("API"). This interface allows a remote administrator or user to manage an individual server computer through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server computer. The virtual-data-center agents relay and enforce device allocations made by the VDC management server VM 810, relay virtual-machine provisioning and configuration-change commands to host agents, monitor and collect performance statistics, alerts, and events communicated to the virtual-data-center agents by the local host agents through the interface API, and to carry out other, similar virtual-data-management tasks.

The virtual-data-center abstraction provides a convenient and efficient level of abstraction for exposing the computational devices of a cloud-computing facility to cloud-computing-infrastructure users. A cloud-director management server exposes virtual devices of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
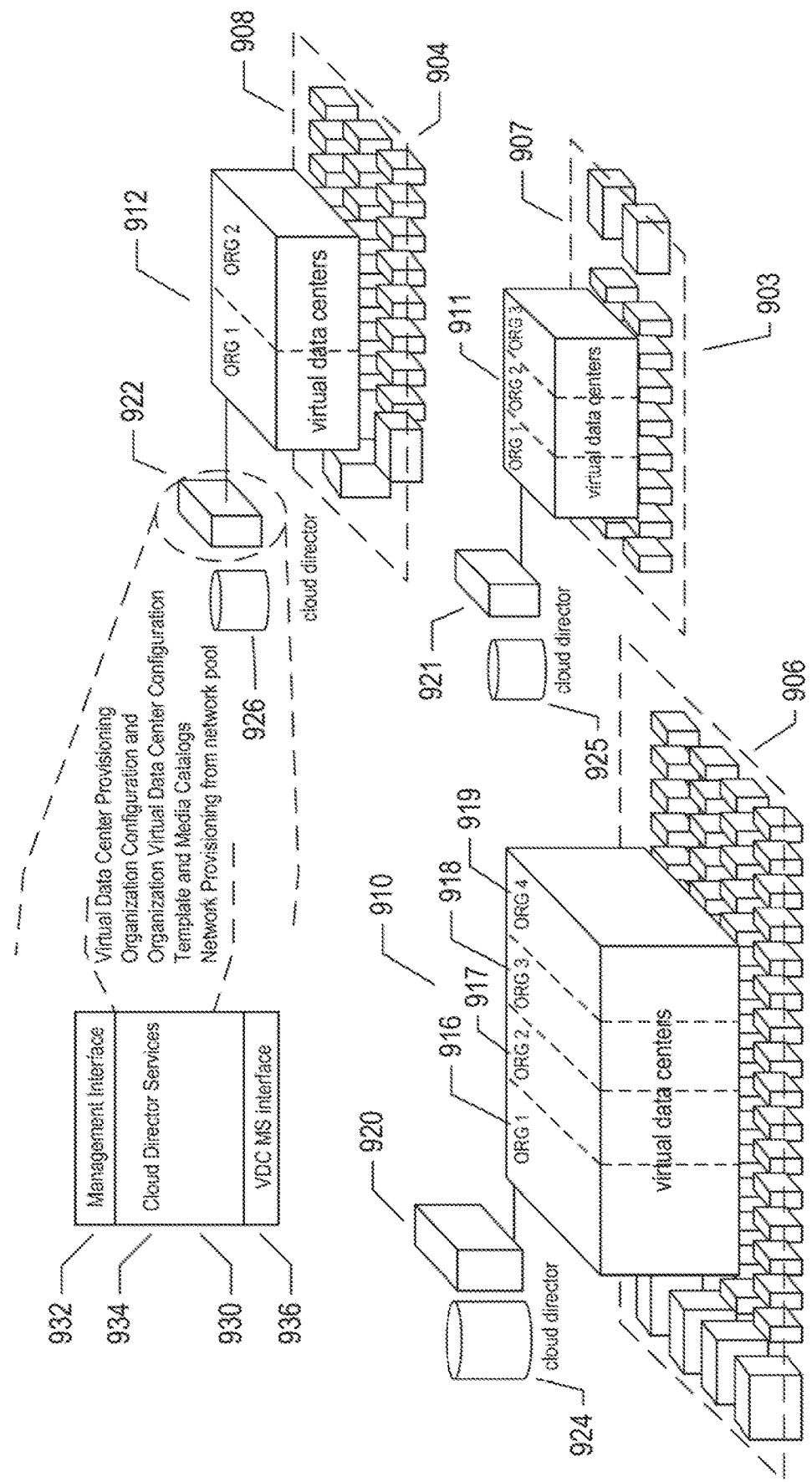
FIG. 9 shows a cloud-director level of abstraction.

FIG. 9 shows a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The devices of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director server computers 920-922 and associated cloud-director databases 924-926. Each cloud-director server computer or server computers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are VMs that each contains an OS and/or one or more VMs containing applications. A template may include much of the detailed contents of VMs and virtual appliances that are encoded within OVF packages, so that the task of configuring a VM or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
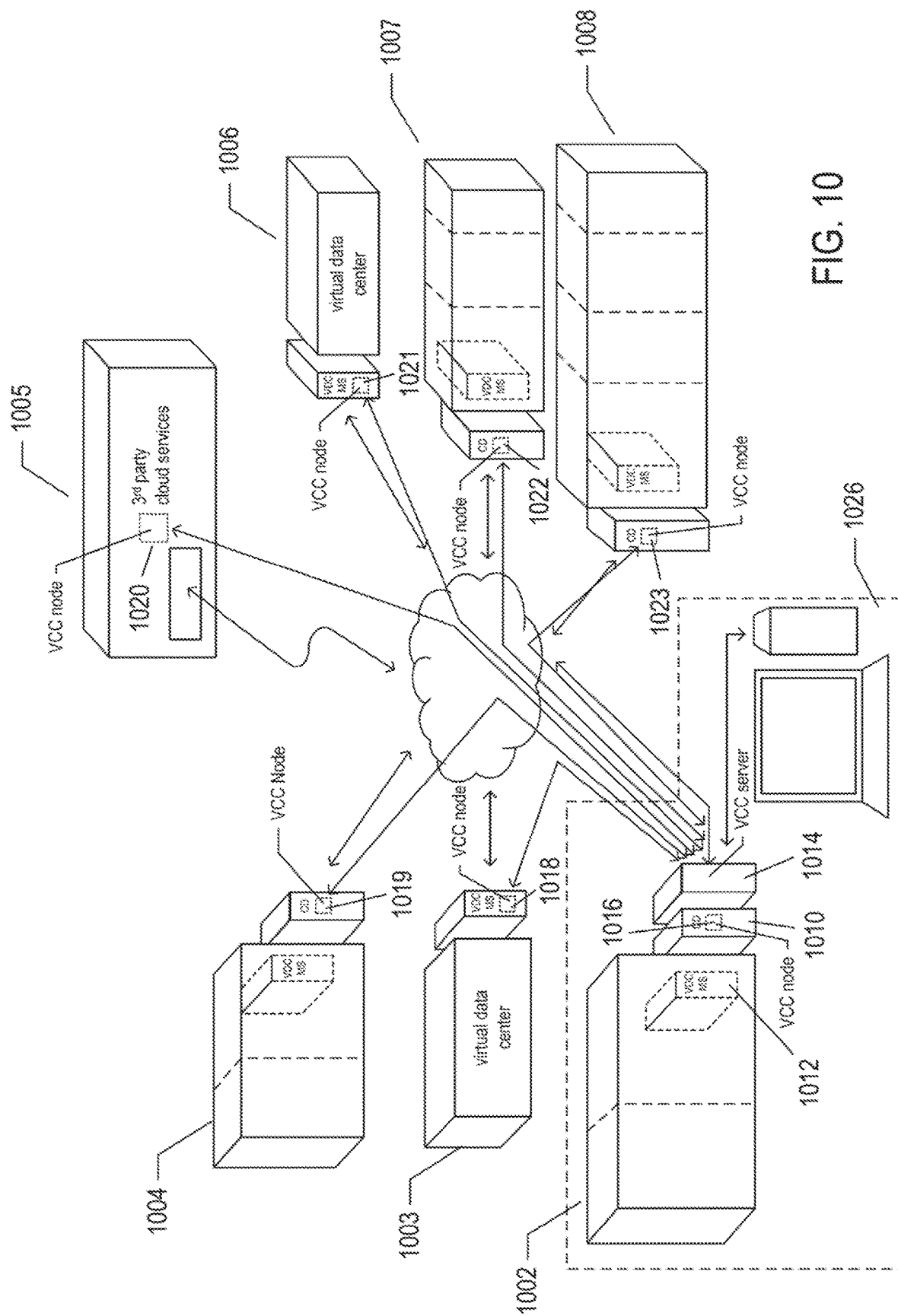
FIG. 10 shows virtual-cloud-connector nodes.

FIG. 10 shows virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are shown 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

As mentioned above, while the virtual-machine-based virtual layers, described in the previous subsection, have received widespread adoption and use in a variety of different environments, from personal computers to enormous distributed computing systems, traditional virtualization technologies are associated with computational overheads. While these computational overheads have steadily decreased, over the years, and often represent ten percent or less of the total computational bandwidth consumed by an application running above a guest operating system in a virtualized environment, traditional virtualization technologies nonetheless involve computational costs in return for the power and flexibility that they provide.

While a traditional virtual layer can simulate the hardware interface expected by any of many different operating systems, OSL virtualization essentially provides a secure partition of the execution environment provided by a particular operating system. As one example, OSL virtualization provides a file system to each container, but the file system provided to the container is essentially a view of a partition of the general file system provided by the underlying operating system of the host. In essence, OSL virtualization uses operating-system features, such as namespace isolation, to isolate each container from the other containers running on the same host. In other words, namespace isolation ensures that each application is executed within the execution environment provided by a container to be isolated from applications executing within the execution environments provided by the other containers. A container cannot access files not included the container's namespace and cannot interact with applications running in other containers. As a result, a container can be booted up much faster than a VM, because the container uses operating-system-kernel features that are already available and functioning within the host. Furthermore, the containers share computational bandwidth, memory, network bandwidth, and other computational resources provided by the operating system, without the overhead associated with computational resources allocated to VMs and virtual layers. Again, however, OSL virtualization does not provide many desirable features of traditional virtualization. As mentioned above, OSL virtualization does not provide a way to run different types of operating systems for different groups of containers within the same host and OSL-virtualization does not provide for live migration of containers between hosts, high-availability functionality, distributed resource scheduling, and other computational functionality provided by traditional virtualization technologies.

Figure 11:
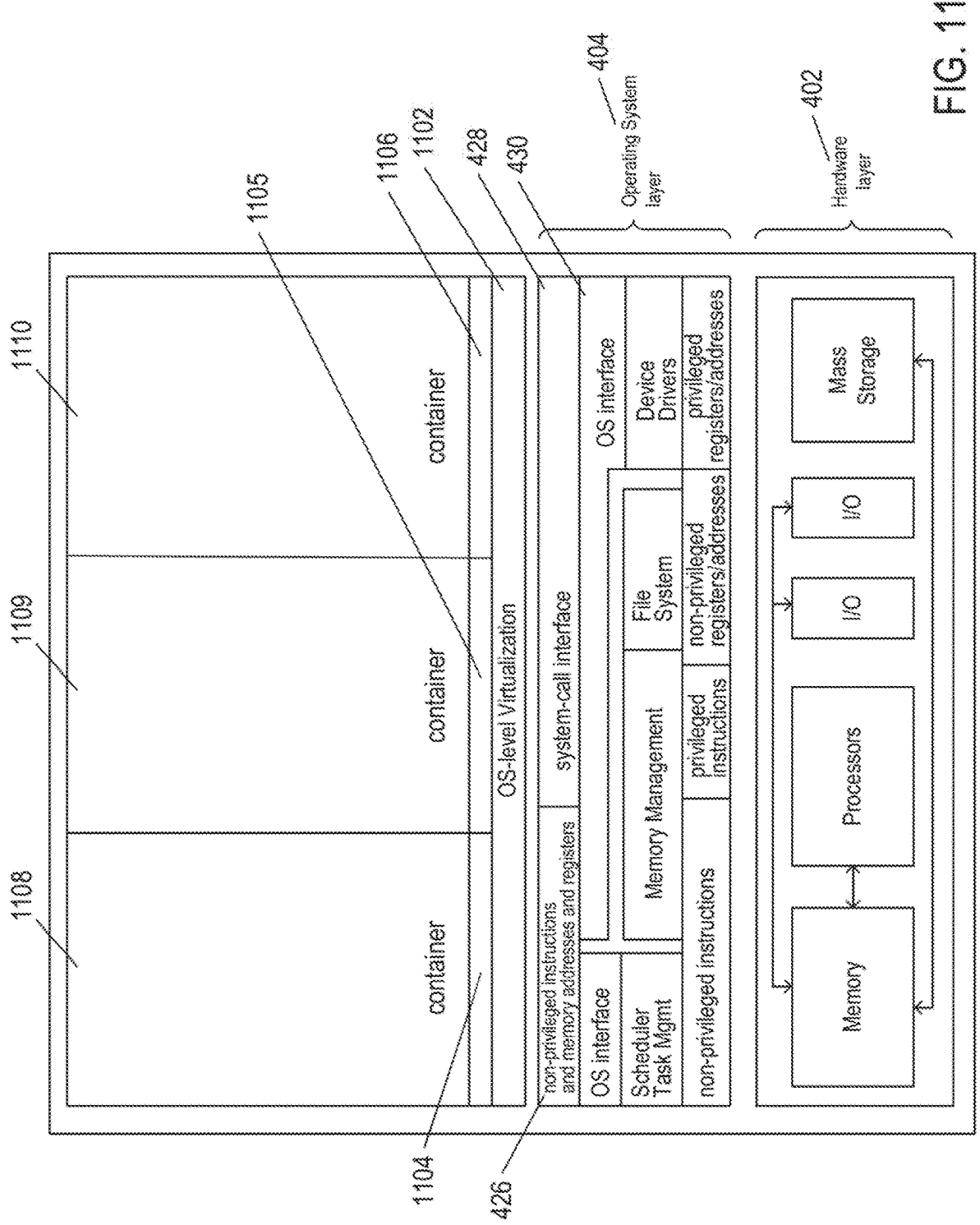
FIG. 11 shows an example server computer used to host three containers.

FIG. 11 shows an example server computer used to host three containers. As discussed above with reference to FIG. 4, an operating system layer 404 runs above the hardware 402 of the host computer. The operating system provides an interface, for higher-level computational entities, that includes a system-call interface 428 and the non-privileged instructions, memory addresses, and registers 426 provided by the hardware layer 402. However, unlike in FIG. 4, in which applications run directly above the operating system layer 404, OSL virtualization involves an OSL virtual layer 1102 that provides operating-system interfaces 1104-1106 to each of the containers 1108-1110. The containers, in turn, provide an execution environment for an application that runs within the execution environment provided by container 1108. The container can be thought of as a partition of the resources generally available to higher-level computational entities through the operating system interface 430.

Figure 12:
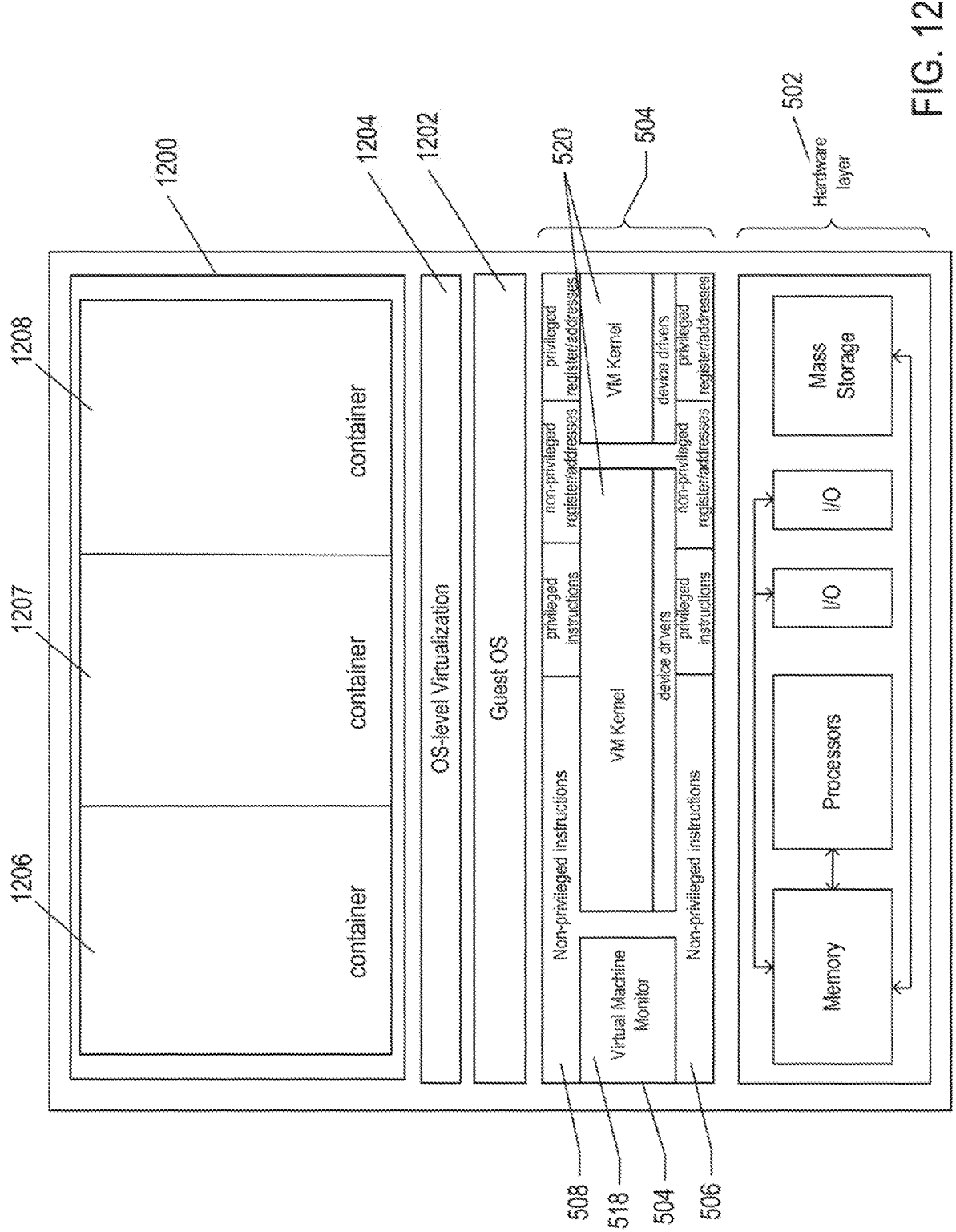
FIG. 12 shows an approach to implementing the containers on a VM.

FIG. 12 shows an approach to implementing the containers on a VM. FIG. 12 shows a host computer similar to that shown in FIG. 5A, discussed above. The host computer includes a hardware layer 502 and a virtual layer 504 that provides a virtual hardware interface 508 to a guest operating system 1102. Unlike in FIG. 5A, the guest operating system interfaces to an OSL-virtual layer 1104 that provides container execution environments 1206-1208 to multiple application programs.

Note that, although only a single guest operating system and OSL virtual layer are shown in FIG. 12, a single virtualized host system can run multiple different guest operating systems within multiple VMs, each of which supports one or more OSL-virtualization containers. A virtualized, distributed computing system that uses guest operating systems running within VMs to support OSL-virtual layers to provide containers for running applications is referred to, in the following discussion, as a "hybrid virtualized distributed computing system."

Running containers above a guest operating system within a VM provides advantages of traditional virtualization in addition to the advantages of OSL virtualization. Containers can be quickly booted in order to provide additional execution environments and associated resources for additional application instances. The resources available to the guest operating system are efficiently partitioned among the containers provided by the OSL-virtual layer 1204 in FIG. 12, because there is almost no additional computational overhead associated with container-based partitioning of computational resources. However, many of the powerful and flexible features of the traditional virtualization technology can be applied to VMs in which containers run above guest operating systems, including live migration from one host to another, various types of high-availability and distributed resource scheduling, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtual layer provides for flexible and scaling over large numbers of hosts within large distributed computing systems and a simple approach to operating-system upgrades and patches. Thus, the use of OSL virtualization above traditional virtualization in a hybrid virtualized distributed computing system, as shown in FIG. 12, provides many of the advantages of both a traditional virtual layer and the advantages of OSL virtualization.

Like a VM or a container, a virtual network is a software-defined approach that presents logical network services, such as switching, routing, firewalls, load balancing, and private networks to connected workloads. The network and security services are created in software that uses IP packet forwarding from the underlying physical network. The workloads may be connected via a logical network, implemented by an overlay network, which allows for virtual networks to be created in software. Network virtualization decouples network services from the underlying hardware by replicating network components and functions in software. Virtualization principles are applied to a physical network infrastructure to create a flexible pool of transport capacity that can be allocated, used, and repurposed on demand. Network virtualization is implemented in a virtual layer and not on network switches.

Figure 13:
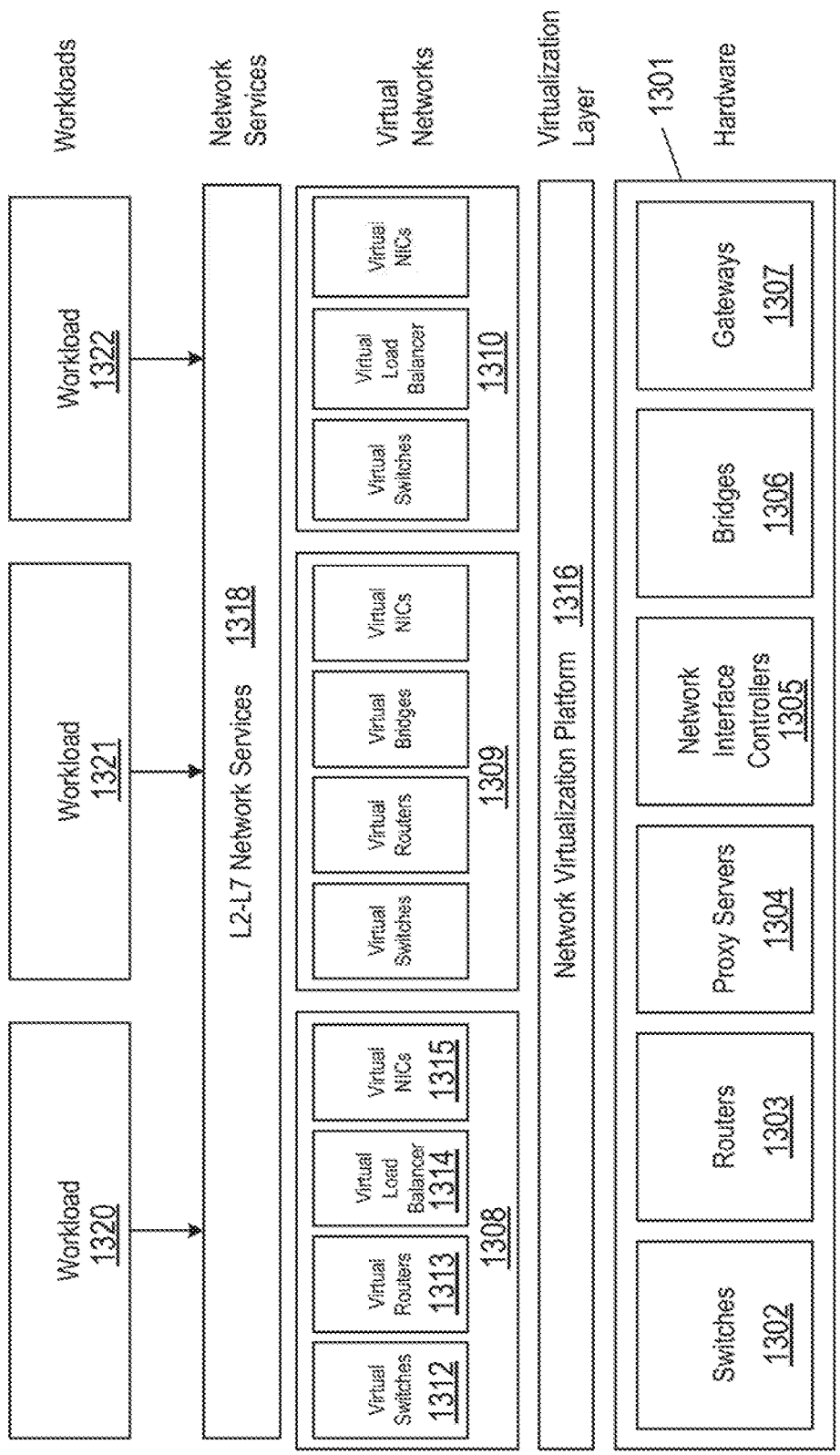
FIG. 13 shows generalized hardware and software components that form virtual networks from a general-purpose physical network.

FIG. 13 shows generalized hardware and software components that form virtual networks from a general-purpose physical network. The physical network is a hardware layer 1301 that is often considered to include switches 1302, routers 1303, proxy servers 1304, network interface controllers 1305, bridges 1306, and gateways 1307. Of course, the physical network may also include many other components, such as power supplies, internal communications links and busses, specialized integrated circuits, and many other components. In the example of FIG. 13, software components form three separate virtual networks 1308-1310. Each virtual network includes virtual network devices. For example, virtual network 1308 includes virtual switches 1312, routers 1313, load balancer 1314, and network interface cards ("NICs") 1315. The virtual networks 1308-1310 interface with components of the hardware layer 1301 through a network virtualization platform 1316 that provisions physical network services, such as L2-L7 network systems interconnection ("OSI") services, to the virtual networks 1308-1310, creating L2-L7 network services 1318 for connected workloads. For example, the virtual switches, such as virtual switch 1312, may provide L2, L3, access control list ("ACL"), and firewall services. In FIG. 13, the virtual networks 1308-1310 provide L2-L7 network services 1318 to connected workloads 1320-1322. The workloads 1320-1322 may have been generated by communicating VMs, containers, and multi-tier applications that are sent using the L2-L7 network services 1318 provided by the virtual networks 1308-1310.

Figure 14A:
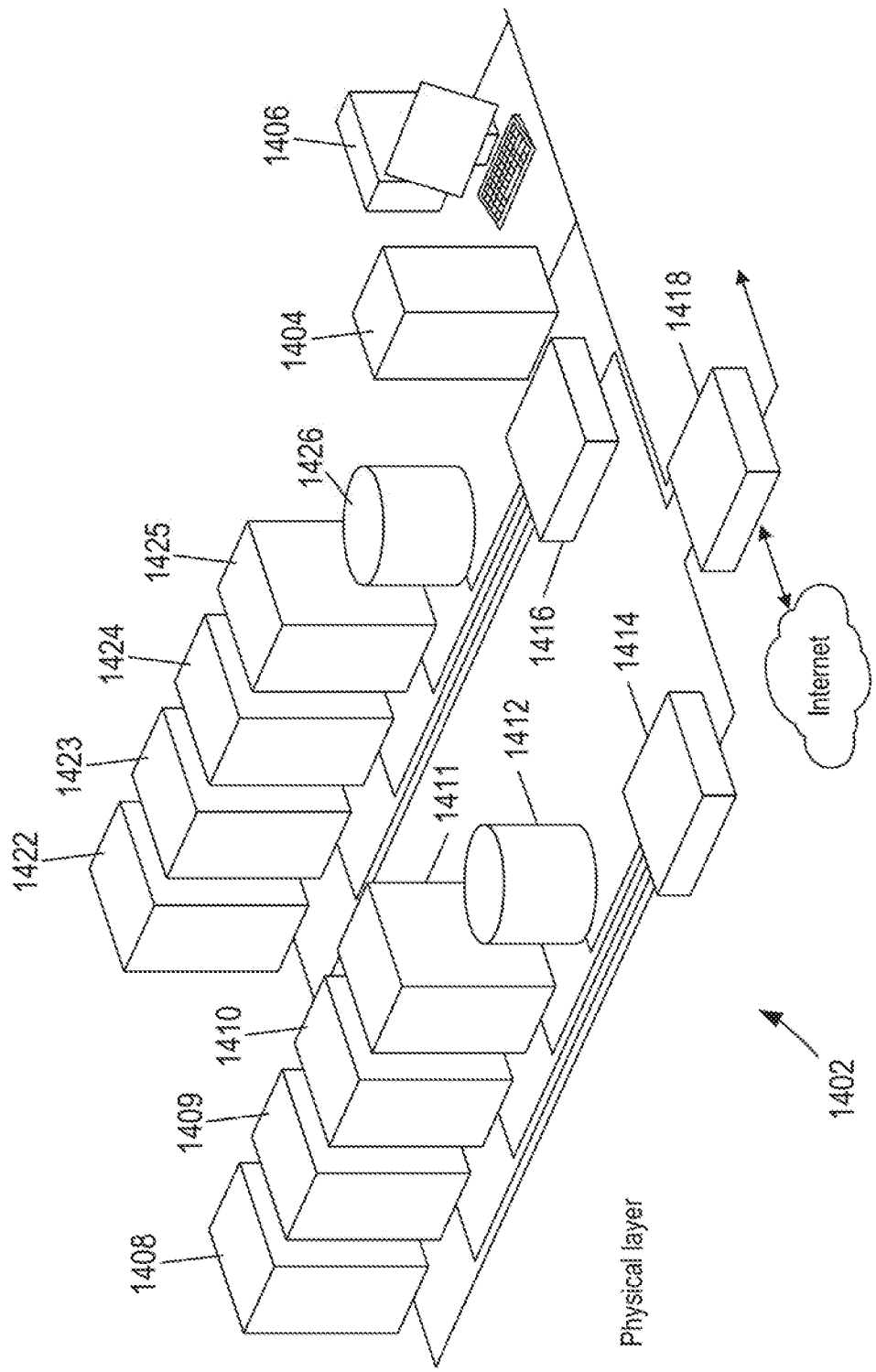
FIGS. 14A-14B show a physical layer of a data center and a virtual layer.
Figure 14B:
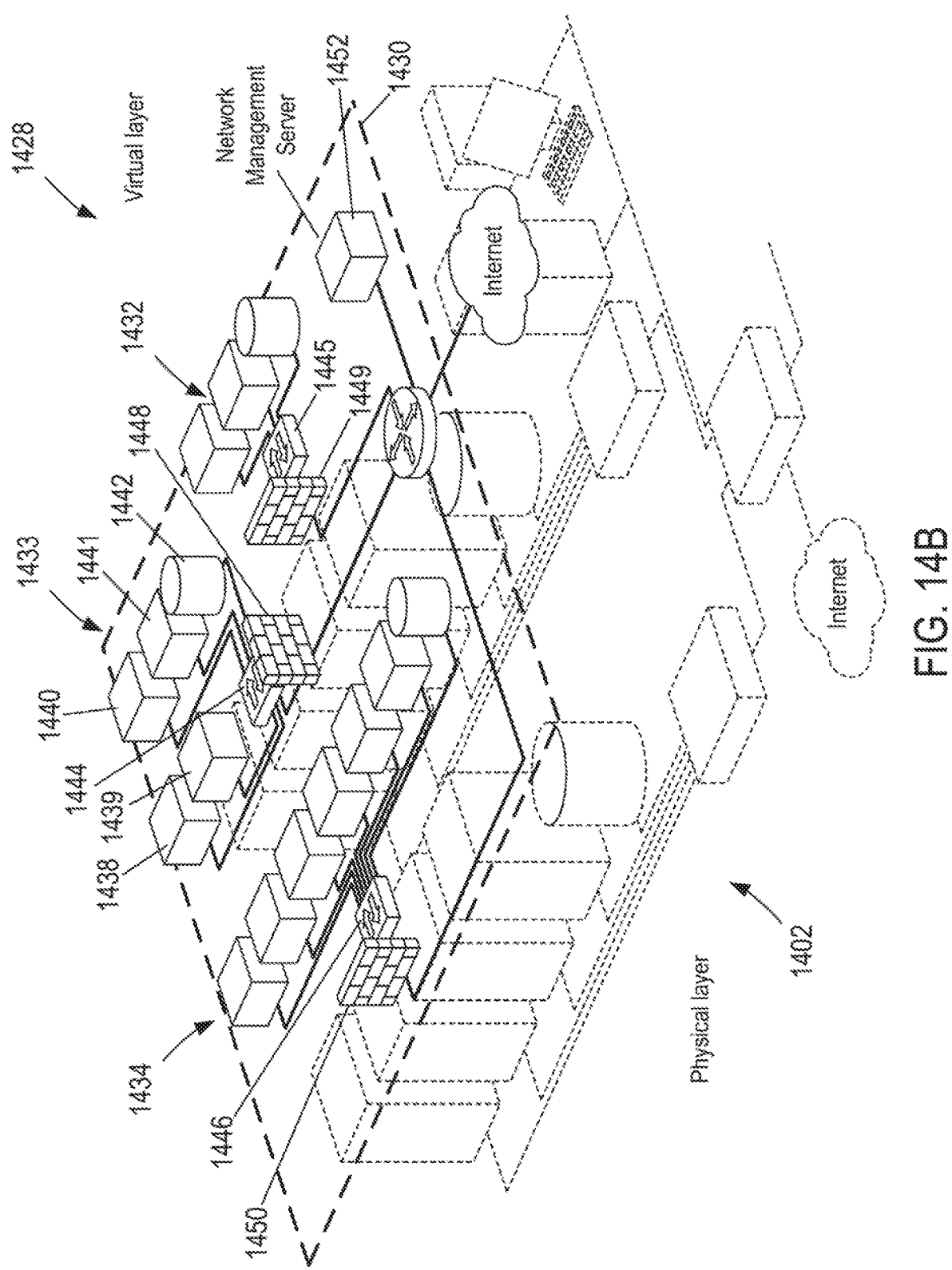

Processes and Systems that Translate Policies Defined for Virtual Objects to Identity Information in a Distributed Computing System Processes and systems described below may be implemented as operations performed by a network management server, such as VMware's NSX® Data Center, that maintains network virtualization and security of a distributed computing system. FIGS. 14A-14B show a physical layer of a data center and a virtual layer. In FIG. 14A, a physical data center 1402 comprises a management server computer 1404 and any of various computers, such as PC 1406, on which a virtual-data-center management interface may be displayed to system administrators and other users. The physical data center 1402 additionally includes hosts or server computers, such as server computers 1408-1411, mass-storage devices, such as a mass-storage device 1412, switches 1414 and 1416, and a router 1418 that connects the server computers and mass-storage devices to the Internet, the virtual-data-center management server 1404, the PC 1406, and other server computers and mass-storage arrays (not shown). In the example of FIG. 14A, each of the switches 1414 and 1416 interconnects four server computers and a mass-storage device to each other and connects the server computers and the mass-storage devices to the router 1418. For example, the switch 1414 interconnects the four server computers 1408-1411 and the mass-storage device 1414 to a router 1420 that is in turn connected to the switch 1416, which interconnects four server computers 1422-1425 and a mass-storage device 1426. The physical data center 1402 is provided as an example of a distributed computing system. Different physical data centers may include many different types of server computers, networks, data-storage systems and devices connected according to many different types of connection topologies. In FIG. 14B, a virtual layer 1428 is separated from the physical data center 1402 by a virtual-interface plane 1430. The virtual layer 1428 includes virtual objects, such as VMs and containers, hosted by the server computers of the physical data center 1402 and three examples of virtual networks 1432-1434. Each virtual network includes a virtual switch that interconnects VMs or containers and a virtual storage to a virtual router 1436. For example, virtual network 1433 comprises VMs 1438-1441 and a virtual storage 1442 interconnected by a virtual switch 1444 that is connected to the virtual router 1436. In the example of FIG. 14B, firewalls 1448-1450 provide network security by monitoring and controlling incoming and outgoing network traffic to the virtual networks 1433-1435 based on predetermined security rules. The firewalls 1448-1450 may be maintained by the virtual router 1436. In an alternative implementation, the firewalls 1448-1450 may be maintained separately by the corresponding virtual switches 1444-1446. The virtual layer 1429 is provided as an example virtual layer. Different virtual layers include many different types of virtual switches, routers, load balancers, and other virtual devices connected according to many different types of network topologies. FIG. 14B also shows a network management server 1452 that is hosted by the management computer server 1404 and maintains policies and performs the translation operations described below.

VMs, containers, and applications are virtual objects that may be configured and arranged in a virtual network to provide client services, such as financial services, web services, software services, infrastructure services, or database services. For example, in FIG. 14B, virtual network 1432 may provide financial services, virtual network 1433 may provide web services, and virtual network 1434 may provide database services. IT administrators define policies for virtual objects of a distributed computing system. A policy is a formal set of rules that determines how a virtual network is used by virtual objects. Policies may be defined to control times when sources of network traffic are allowed to send data or when destinations for network traffic are allowed to receive data. A firewall rule is an example of a policy defined for virtual objects by IT administrators. For example, each VM has an assigned IP address and the application and operating system running in each VM have one or more associated processes that each have a logical port address created by the operating system of the VM or the server computer running the VM. In other words, the IP address identifies the particular VM and the logical port address identifies the particular process executed by the VM. A firewall rule identifies a source VM by a corresponding IP address and/or logical port address and a destination VM by a corresponding IP addresses and/or logical port address. A source sends data in packets over a virtual network to a destination. Each packet has a packet header that contains source information, such as the source IP address and logical port address of the process that created the data, destination information, such as the destination IP address and logical port address of the process to receive the data, and the data itself called the payload. Firewall rules are executed by a firewall network system, also called a "firewall," that uses the IP addresses and logical port addresses of the source and destination to control network traffic arriving at the destination by determining whether the packets are allowed, denied, or dropped. The firewall rules may also have a default firewall rule for dropping or denying packets received with source IP addresses that are not listed in the firewall rules.

Figure 15:
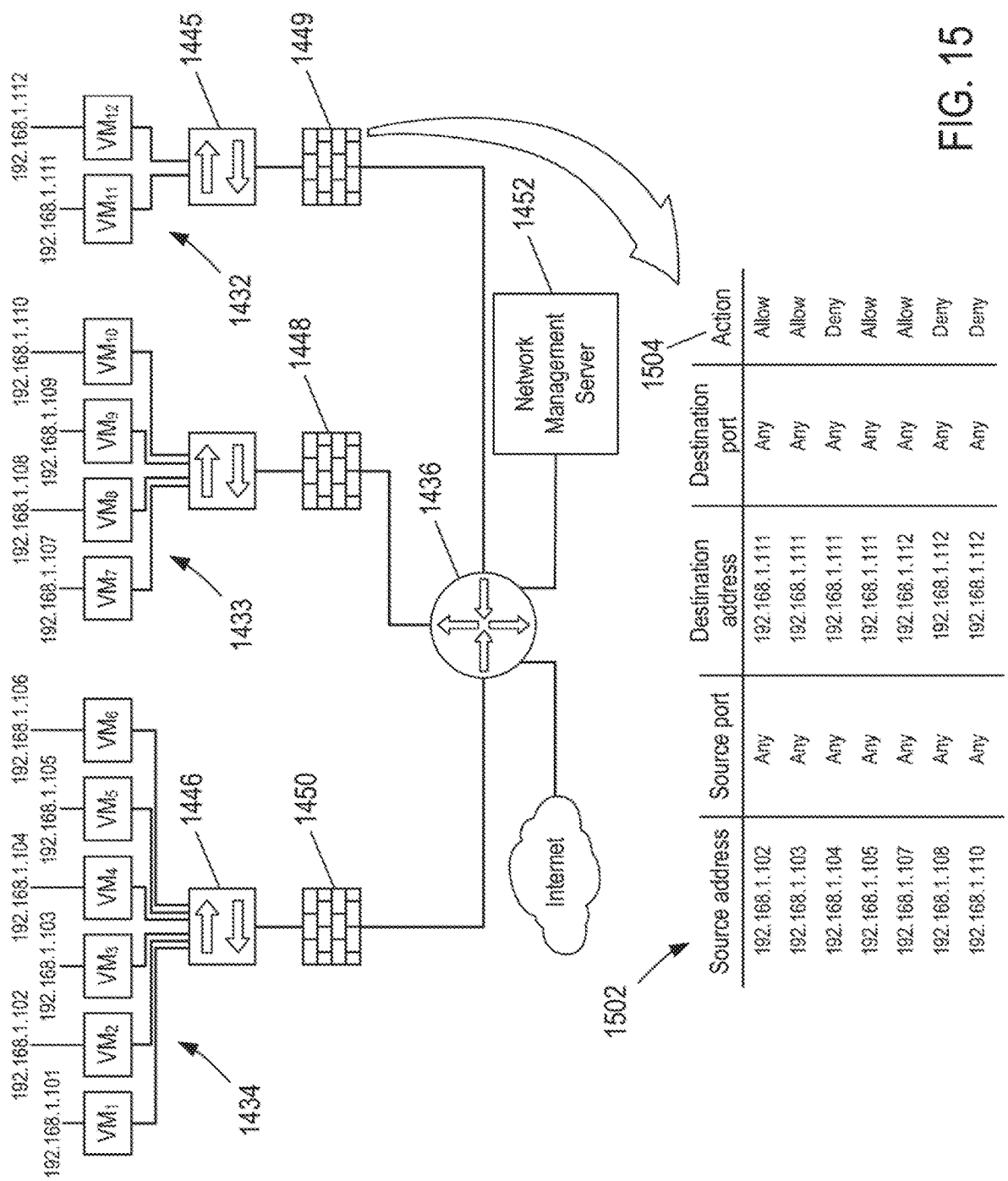
FIG. 15 shows an example of firewall rules for VMs in virtual networks.

FIG. 15 shows an example of firewall rules for the VMs in the virtual networks 1432-1434 in FIG. 14B. The VMs are labeled $VM_1, \ldots, VM_{12}$ and include corresponding IP addresses. FIG. 15 shows an example firewall rules table 1502 for the firewall 1449. The firewall rules table includes a list of source addresses, a list of source ports, a list of destination address, and a list of destination ports. The source addresses are the IP addresses of $VM_2$, $VM_3$, $VM_4$, $VM_5$, $VM_7$, $VM_8$, and $VM_{10}$ and the destination addresses are the IP addresses VMs $VM_{11}$ and $VM_{12}$. The example firewall rules do not include specific logical port addresses. In other words, the firewall rules express policies that are not concerned with the particular processes executed by the VMs but are instead concerned with network traffic between particular VMs. Column 1504 states whether network traffic from the source addresses are allowed or denied at the destination addresses. Firewall rules are set by the IT administrator on the network management server 1452. The firewall 1449 provides a firewall service based on the firewall rules stated in the firewall rules table.

A firewall uses a firewall rules table to allow or deny network traffic from source to destination and does not consider the virtual objects or devices that generated the network traffic. In other words, when a packet arrives at the firewall, the firewall examines the header for the source IP address and compares the source IP address to the firewall rules to determine whether to allow or deny transmission of the packet to the destination. It should be noted that firewalls also use other types of filters to control the destination of network traffic, such as stateful filters and other forms of packet filtering.

Processes and systems translate the policies for virtual objects into identity information of a service or process that can understood and used to execute the policies. For example, the network management server 1452 translates the identity of virtual objects, such as VMs, containers, and applications, to corresponding IP addresses and translates processes running on the VMs, containers, and application, to logical port addresses that can be used by applications and devices located outside the distributed computing system to access the services provided by the virtual objects.

Figure 16:
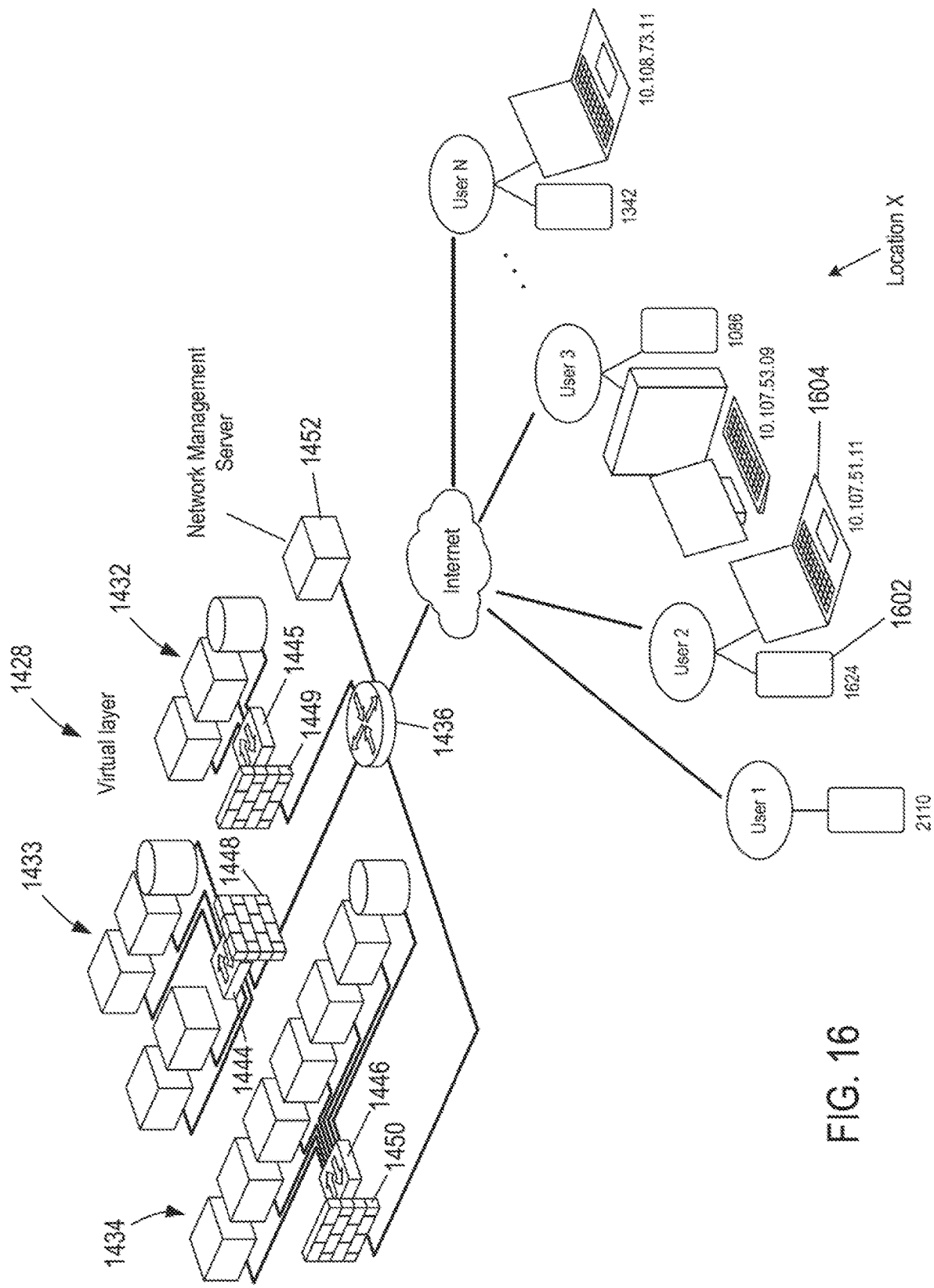
FIG. 16 shows an example of users that would like access to services and processes provided by applications running in VMs of a virtual layer.

FIG. 16 shows an example of N users at a remote location X that would like access to services and processes provided by the applications running in the VMs of the virtual layer 1428. Each user has one or two computing devices with a corresponding device ID and IP addresses. For example, User 2 has a mobile device 1602 and a laptop 1602. The mobile device 1602 may be a smart phone or a tablet. The mobile device 1602 has a device address "1624" and the laptop 1604 has an IP address "10.107.51.11." However, the firewall rules tables for the firewalls 1446, 1448 and 1449 do not allow the N user devices at the location X access to the services provided by the virtual objects of the virtual layer 1428. For example, the firewall rules tables may have a default firewall rule that denies access from IP addresses and logical port addresses that are not listed in the firewall rules tables for the firewalls 1449, 1444, and 1450.

Figure 17:
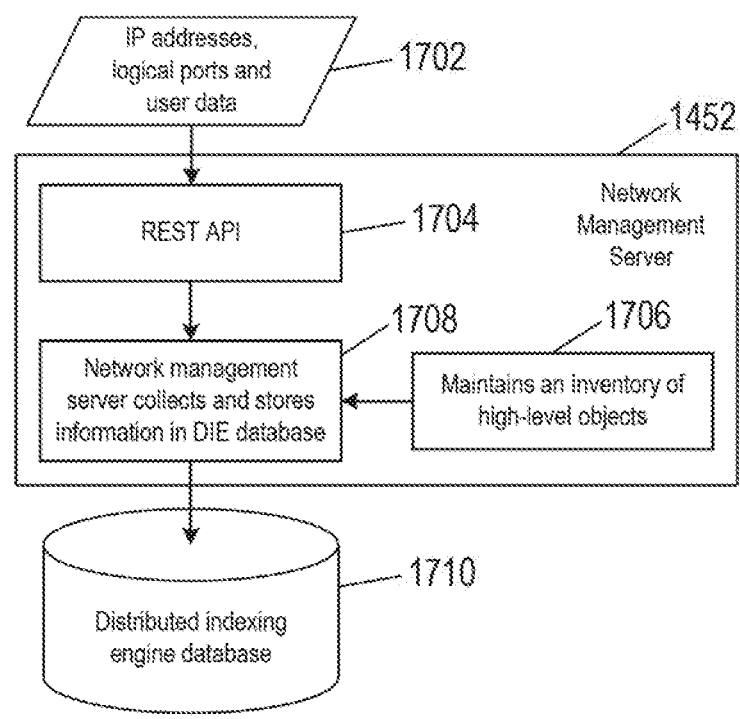
FIG. 17 shows input to a network management server.

FIG. 17 shows input 1702 to the network management server 1452. The input 1702 includes user data, such as identify of user and associated computing device IP addresses. In block 1704, the network management server 1704 uses a REST API ("representational state transfer application program interface") to receive the user data as input. In block 1706, the network management server 1452 proactively searches for virtual objects, such as VMs, running on server computers of the distributed computer system and maintains an inventory of the virtual objects, IP addresses, and logical port addresses. The network management server 1452 in a DIE database 1710. In block 1708, the network management server 1452 creates object graphs of the users and the virtual objects and stores the user data and inventory of virtual objects, IP addresses, logical port addresses and the object graphs in the DIE database 1710.

FIG. 18 shows an example of virtual objects and user indexes stored in the DIE database for the virtual objects of the virtual layer 1428 and the users at the location X. Table 1802 shows an index of VMs and associated IP addresses for the VMs in FIG. 16. Table 1804 shows an index of users at the location X and associated device addresses. Table 1806 shows an index of users at the location X and associated IP addresses for laptops and desktop computers used by users.

Figure 19:
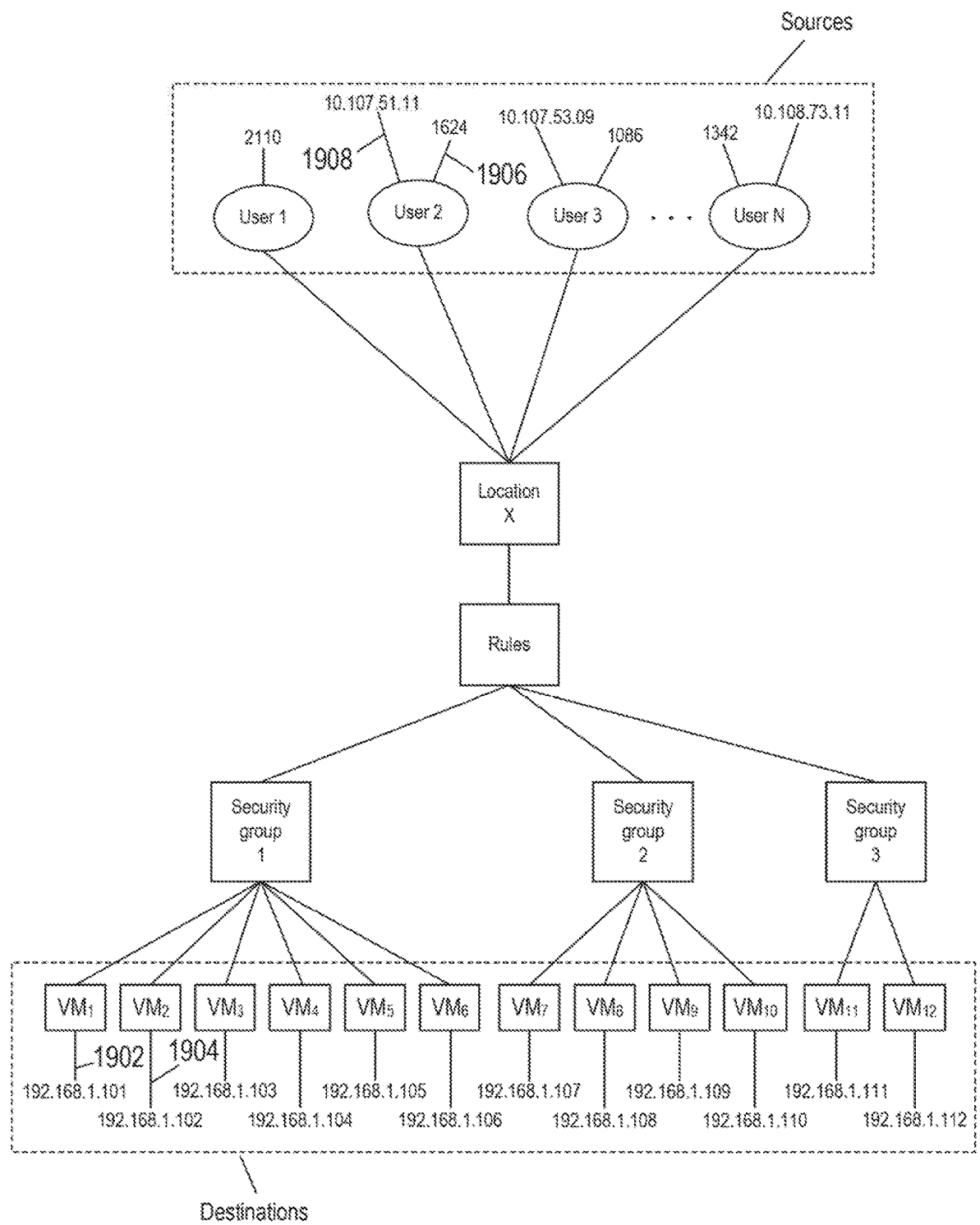
FIG. 19 shows an example of an object graph.

FIG. 19 shows an example of an object graph constructed by the network management server from the user information and VM information stored in the DIE database. The nodes of the object graph are called objects. The objects may be user location X, users at the location X, IP and device addresses of user devices, security groups defined for the VMs, VMs, and IP addresses of VMs. Edges represent the relationships between the nodes or the objects. For example, edge 1902 represents a relationship between $VM_1$ and the IP address 192.168.1.101 and edge 1904 represents a relationship between $VM_2$ and the IP address 192.168.1.102. Edges 1906 and 1908 represent relationships between User 2 and device number 1624 and IP address 10.107.51.11.

Figure 20:
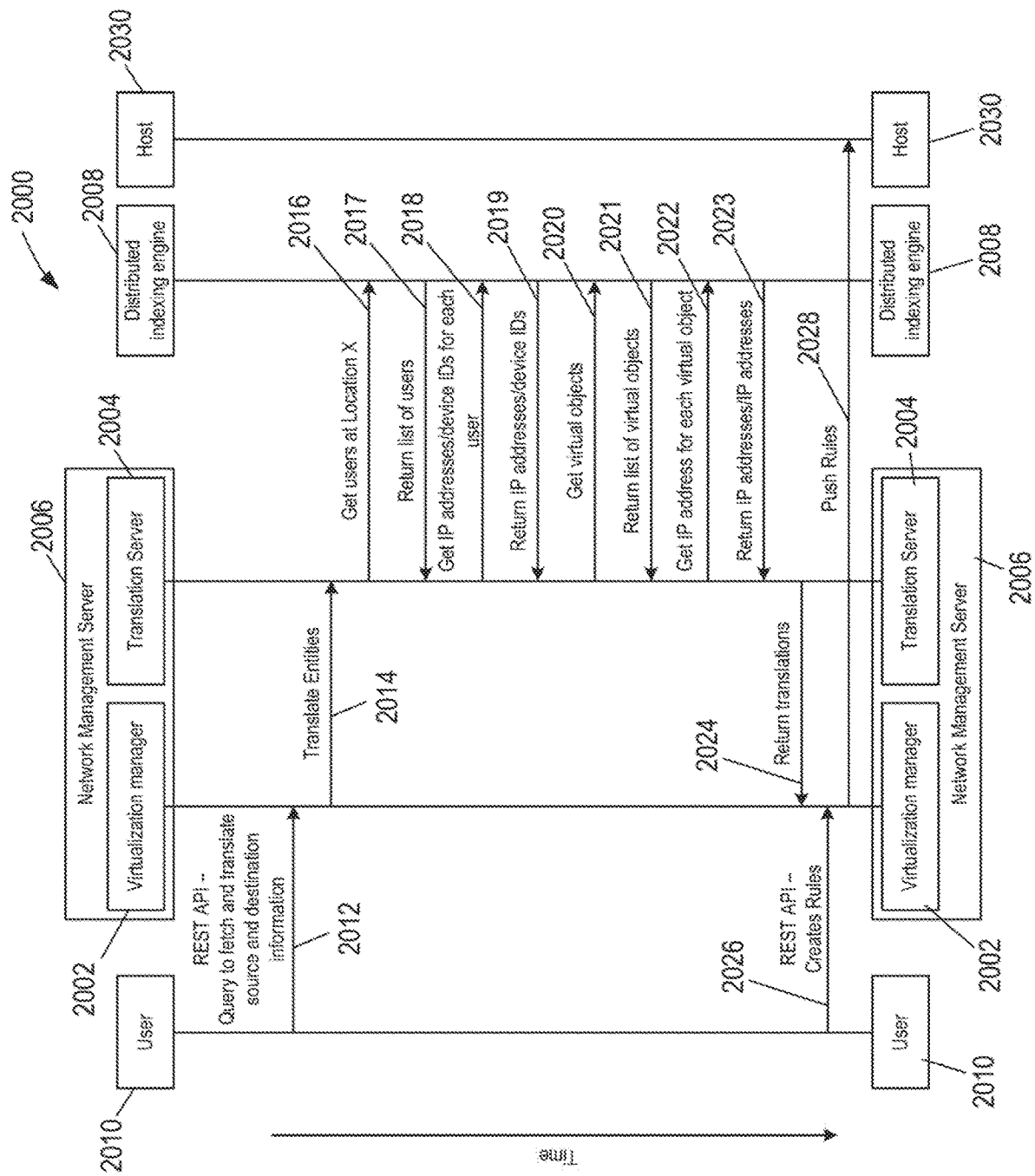
FIG. 20 shows an example of a sequence diagram for translating policies into identity information.

FIG. 20 shows an example of a sequence diagram 2000 for translating policies for user access to virtual objects into identity information. The sequence diagram 2000 represents the operations that are carried by a virtualization manager 2002 and a translation server 2004 of a network management server 2006 and operations carried by a distributed indexing engine 2008 in response to a request to translate the policies for virtual objects to identity information. In the example of FIG. 20, a user 2010 enters a request 2012 to translate a policy for access to services provided by the virtual objects by computing devices of the location X. In response to the request 2012, the virtualization manager 2002 directs 2014 the translation server 2004 to translate entities (i.e., translate users and virtual objects to address information). The translation server 2004 then directs 2016 the DIE 2008 to traverse the object graph stored in the DIE for a list of users at the location X. After traversing the object graph for user information at the location X, the DIE 2008 returns 2017 a list of the users at the location X to the translation server 2004. The translation server 2004 directs the DIE 2008 to fetch 2018 IP addresses and device addresses of computing devices of the users at the location X. The DIE 2008 traverses the object graph and returns 2019 a list of IP addresses and devices addresses of the computing devices used by the users at the location X. The translation server 2004 then directs the DIE 2008 to fetch 2020 a list of virtual objects running in the distributed computing system. The DIE 2008 traverses the object graph and returns 2021 a list of the virtual objects. The translation server 2004 directs the DIE 1908 to fetch 2022 the IP addresses of the virtual object. The DIE 2008 traverses the object graph and returns 2023 the list of IP addresses of the virtual objects and may also return logical port addresses of the processes of the virtual objects. The translation server 2004 returns 2024 the list of user and IP and device addresses used by the users at location X and returns the list of virtual objects and associated IP addresses and logical port addresses in the distributed computing system to the virtualization manager 2002. The user 2010 is presented with the list of users and associated IP addresses and device addresses of devices used by the user at location X and the list of virtual objects and associated IP addresses in the distributed computing system the REST API. The user 2010 creates rules 2026 using the REST API. For example, the user may create firewall rules or the user may create other rules regarding user computing device access to the services provided by the virtual objects of the distributed computing systems. The virtualization manager 2002 pushes the rules 2028 to the respective hosts 2030, virtual switches, or virtual routers that execute the rules. For example, the rules may be added to firewall rules tables used by the hosts, virtual switches, and routers to execute the policies translated into the firewall rules. The virtualization manager 2002 distributes the firewall rules by saving the rules in the firewall rules tables used by the firewalls, virtual switches, and virtual routers of the distributed computing system to accordingly allow and deny network traffic between the computing devices of the user at the location X and services provided by the virtual objects of the distributed computing system. The rules created by the user 2010 are persisted by the DIE 2008 as an object graph that is stored in the DIE database.

Figure 21:
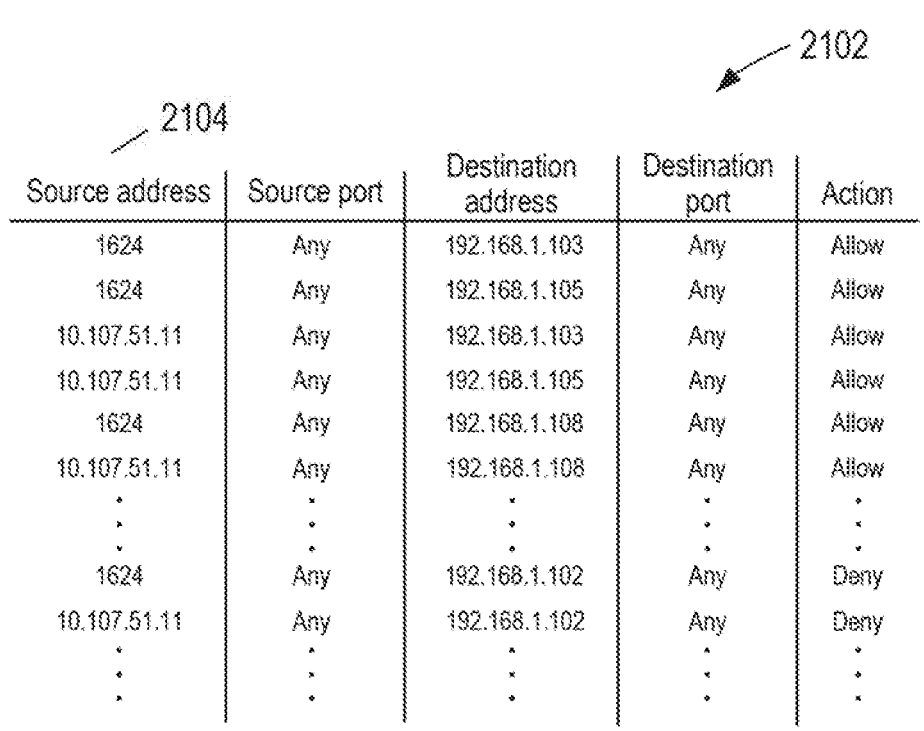
FIG. 21 shows examples of firewall rules tables for a and virtual objects of a virtual layer.

FIG. 21 shows an example of a firewall rules tables 2102 for the User 2 and virtual objects of the virtual layer 1428. The source addresses in columns 2104 are the device and IP addresses of User 2 in FIG. 16. In firewall rules table 2202, rules have been created that allow data to be sent from the devices of User 2 to $VM_3$, $VM_5$, and VMs regardless of source and destination logical port addresses Firewall rules table 2002 also includes rules that deny sending data to $VM_2$.

It is appreciated that the previous description of the disclosed embodiments is provided to enable any person skilled in the art to make or use the present disclosure. Various modifications to these embodiments will be apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. In a process stored in one or more data-storage devices and executed using one or more processors of a computer system to translate policies for virtual objects of a distributed computing system, the specific improvement comprising:
    in response to a request to translate a policy to allow access to services of the virtual objects by computing devices located outside the distributed computing system, traversing an object graph that represents relationships between users of the computing devices and identity information of the computing devices and represents relationships between the virtual objects and identity information of the virtual objects to determine the identity information of the computing devices and the virtual objects;
    presenting the identify information of the computing devices and the virtual objects in an application programming interface that enables creation of rules that control access to services provided the virtual objects by the computing devices; and
    distributing the rules to hosts of the distributed computing system that execute the rules, thereby allowing the computing devices located outside the distributed computing system to access the services and processes provided by the virtual objects.

2. The process of claim 1 further comprises:
    receiving user information and the identity information of the computing devices used by the users;
    storing the identify information of the computing devices in a distributed indexing engine database;
    searching the distributed computing system for identify information of virtual objects of the distributed computing system;
    storing the identify information of virtual objects of the distributed computing system in the distributed indexing engine database; and
    constructing the object graph that represents relationships between users of the computing devices and the identity information of the computing devices and represents relationships between the virtual objects and the identity information of the virtual objects.

3. The process of claim 1 wherein traversing an object graph comprises using a distributed indexing engine to
    fetching user information from a distributed indexing engine database;
    fetching IP address information of the computing devices from the distributed indexing engine database; and
    fetching IP addresses of the virtual objects from the distributed indexing engine database.

4. The process of claim 1 wherein traversing the object graph comprises:

storing the object graph in a distributed indexing engine database; and using a distributed indexing engine to traverse the object graph.

5. The process of claim 1 wherein the hosts are any one or more of virtual switches, virtual routers, and server computers that host the virtual objects.

6. A computer system to translate policies for virtual objects of a distributed computing system, the system comprising:
    one or more processors;
    one or more data-storage devices; and
    machine-readable instructions stored in the one or more data-storage devices that when executed using the one or more processors controls the system to perform operations comprising:
        in response to a request to translate a policy to allow access to services of the virtual objects by computing devices located outside the distributed computing system, traversing an object graph that represents relationships between users of the computing devices and identity information of the computing devices and represents relationships between the virtual objects and identity information of the virtual objects to determine the identity information of the computing devices and the virtual objects;
        presenting the identify information of the computing devices and the virtual objects in an application programming interface that enables creation of rules that control access to services provided the virtual objects by the computing devices; and
        distributing the rules to hosts of the distributed computing system that execute the rules.

7. The computer system of claim 6 further comprises:
    receiving user information and the identity information of the computing devices used by the user;
    storing the identify information of the computing devices in a distributed indexing engine database;
    searching the distributed computing system for identify information of virtual objects of the distributed computing system;
    storing the identify information of virtual objects of the distributed computing system in the distributed indexing engine database; and
    constructing the object graph that represents relationships between users of the computing devices and the identity information of the computing devices and represents relationships between the virtual objects and the identity information of the virtual objects.

8. The computer system of claim 6 wherein traversing an object graph comprises:
    fetching user information from a distributed indexing engine database;
    fetching IP address information of the computing devices from the distributed indexing engine database; and
    fetching IP addresses of the virtual objects from the distributed indexing engine database.

9. The computer system of claim 6 wherein traversing the object graph comprises:
    storing the object graph in a distributed indexing engine database; and
    using a distributed indexing engine to traverse the object graph.

10. Apparatus for translating policies for virtual objects of a distributed computing system, the apparatus comprising:
    means for receiving a request to translate a policy to allow access to services of virtual objects by computing devices located outside the distributed computing system;
    means for traversing an object graph that represents relationships between users of the computing devices and identity information of the computing devices and represents relationships between the virtual objects and identity information of the virtual objects to determine the identity information of the computing devices and the virtual objects; and
    means for distributing the rules to hosts of the distributed computing system that execute the rules.

11. The apparatus of claim 10 further comprises:
    means for receiving user information and the identity information of the computing devices used by the users;
    means for storing the identify information of the computing devices in a distributed indexing engine database;
    means for searching the distributed computing system for identify information of virtual objects of the distributed computing system;
    means for storing the identify information of virtual objects of the distributed computing system in the distributed indexing engine database; and
    means for constructing the object graph that represents relationships between users of the computing devices and the identity information of the computing devices and represents relationships between the virtual objects and the identity information of the virtual objects.

12. The apparatus of claim 10 wherein the means for traversing the object graph comprises a distributed indexing engine that
    fetches user information from a distributed indexing engine database;
    fetches IP address information of the computing devices from the distributed indexing engine database; and
    fetches IP addresses of the virtual objects from the distributed indexing engine database.

13. The apparatus of claim 10 wherein means for traversing the object graph
    stores the object graph in a distributed indexing engine database; and
    uses a distributed indexing engine to traverse the object graph.

* * * * *